US011560256B2

(12) United States Patent
Shawaf et al.

(10) Patent No.: US 11,560,256 B2
(45) Date of Patent: *Jan. 24, 2023

(54) ROTO MOLDED PALLET

(71) Applicant: Paxxal Inc., Noblesville, IN (US)

(72) Inventors: Omar Shawaf, Riyadh (SA); Ezzeldin Elmassry, Noblesville, IN (US); Moustapha Bahsoun, Beirut (LB); Michael Laible, Pembroke Pines, FL (US); Ben Stoller, Orlando, FL (US); John Charny, Richmond Heights, OH (US); Ellwood Phillip Hunt, III, Orlando, FL (US); Thomas Richard Hopson, III, Greenwood, IN (US)

(73) Assignee: Paxxal Inc., Noblesville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,275

(22) Filed: Jun. 24, 2021

(65) Prior Publication Data

US 2022/0009672 A1    Jan. 13, 2022

Related U.S. Application Data

(63) Continuation of application No. 16/520,770, filed on Jul. 24, 2019, now abandoned.

(Continued)

(51) Int. Cl.
*B65D 19/00* (2006.01)
*B65D 19/38* (2006.01)

(52) U.S. Cl.
CPC ......... *B65D 19/0016* (2013.01); *B65D 19/38* (2013.01); *B65D 2519/00039* (2013.01);

(Continued)

(58) Field of Classification Search
CPC ............... B65D 19/38; B65D 19/00; B65D 2519/00039; B65D 2519/00069;

(Continued)

(56) References Cited

U.S. PATENT DOCUMENTS 3,511,191 A    5/1970  Barry, Jr. et al.
3,664,271 A    5/1972  Wolder et al.
(Continued)

FOREIGN PATENT DOCUMENTS

EP    1 021 346 B1    7/2002
EP    1 744 966 B1    12/2008
(Continued)

OTHER PUBLICATIONS

European Search Report issued in related EP19188157.2 dated Nov. 5, 2019.

(Continued)

*Primary Examiner* — Jose V Chen
(74) *Attorney, Agent, or Firm* — Woodard, Emhardt, Henry, Reeves & Wagner, LLP

(57) ABSTRACT

A pallet assembly includes a support assembly and a base assembly. The support assembly has a deck molded from a plastic shell material and male fittings that extend away from a lower surface of said deck. The base assembly includes a stringer that defines a plurality of openings which extend through the entirety of the stringer. A female fitting extends completely through each of the openings in the stringer so that the base of each of the female fittings is flush with or extends beyond the bottom surface of said stringer. Each of the male fittings corresponds to a female fitting, attaching said support assembly to said base assembly.

21 Claims, 23 Drawing Sheets

Related U.S. Application Data

(60) Provisional application No. 62/703,129, filed on Jul. 25, 2018.

(52) U.S. Cl.
CPC .............. *B65D 2519/00074* (2013.01); *B65D 2519/00273* (2013.01); *B65D 2519/00288* (2013.01); *B65D 2519/00318* (2013.01); *B65D 2519/00333* (2013.01); *B65D 2519/00567* (2013.01); *B65D 2519/00955* (2013.01)

(58) Field of Classification Search
CPC ........... B65D 2519/00074; B65D 2519/00104; B65D 2519/00109; B65D 2519/00119; B65D 2519/00288; B65D 2519/00398; B65D 2519/00432
USPC ................ 108/56.1, 56.3, 57.25, 57.26, 53.5
See application file for complete search history.

(56) References Cited

U.S. PATENT DOCUMENTS

| | | | |
|---|---|---|---|
| 3,691,964 | A | 9/1972 | Larson |
| 3,719,157 | A | 3/1973 | Arcocha et al. |
| 3,880,092 | A | 4/1975 | Seeber et al. |
| 3,915,099 | A | 10/1975 | Wies et al. |
| 4,051,787 | A | 10/1977 | Nishitani et al. |
| 5,186,338 | A | 2/1993 | Boutet |
| 5,193,464 | A | 3/1993 | Morden |
| 5,197,395 | A | 3/1993 | Pigott et al. |
| 5,460,292 | A | 10/1995 | Holman |
| 5,492,069 | A | 2/1996 | Alexander et al. |
| D379,021 | S | 4/1997 | Wies |
| 5,666,886 | A | 9/1997 | Alexander et al. |
| 5,687,652 | A | 11/1997 | Ruma |
| 6,053,466 | A | 4/2000 | Jordan et al. |
| 6,109,190 | A | 8/2000 | Hale et al. |
| 6,199,488 | B1 | 3/2001 | Favaron et al. |
| 6,564,725 | B2 | 5/2003 | Hale |
| 6,749,418 | B2 | 6/2004 | Muirhead |
| 6,758,148 | B2 | 7/2004 | Torrey et al. |
| 7,752,980 | B2 | 7/2010 | Muirhead |
| 7,779,765 | B2 | 8/2010 | Donnell et al. |
| 7,963,410 | B2 | 6/2011 | Joergensen et al. |
| 8,006,629 | B2 | 8/2011 | Naidu |
| 8,127,691 | B2 | 3/2012 | Ingham |
| 8,596,207 | B2 | 12/2013 | Dubois et al. |
| 8,596,459 | B2 | 12/2013 | Hulzlnghetai. |
| 8,701,569 | B2 | 4/2014 | Linares |
| 8,950,342 | B2 | 2/2015 | Plattner |
| 8,955,709 | B2 | 2/2015 | Lorenz et al. |
| 9,138,945 | B2 | 9/2015 | Rimmer |
| 9,221,580 | B2 | 12/2015 | Zelek et al. |
| 9,352,876 | B2 | 5/2016 | Muirhead |
| 10,005,586 | B1 | 6/2018 | Miller |
| 10,589,897 | B1 | 3/2020 | Shawaf et al. |
| 2002/0112653 | A1 | 8/2002 | Moore et al. |
| 2004/0159267 | A1 | 8/2004 | Markling et al. |
| 2005/0145145 | A1 | 7/2005 | Ogburn et al. |
| 2005/0193929 | A1 | 9/2005 | Ingham |
| 2005/0237184 | A1 | 10/2005 | Muirhead |
| 2006/0272556 | A1 | 12/2006 | Apps |
| 2006/0278138 | A1 | 12/2006 | Chi |
| 2007/0028814 | A1 | 2/2007 | Swistak et al. |
| 2008/0210140 | A1 | 9/2008 | Valentinsson |
| 2008/0236455 | A1 | 10/2008 | Naidu |
| 2010/0043678 | A1 | 2/2010 | Linares |
| 2010/0154685 | A1 | 6/2010 | Arinstein |
| 2010/0206200 | A1 | 8/2010 | Tosse |
| 2010/0288169 | A1 | 11/2010 | Du Toit |
| 2011/0120353 | A1 | 5/2011 | Jensen et al. |
| 2011/0179978 | A1 | 7/2011 | Schmitt |
| 2011/0253016 | A1 | 10/2011 | Leakey |
| 2012/0318692 | A1 | 12/2012 | Kellerer |
| 2013/0133557 | A1 | 5/2013 | Yoshinaga |
| 2014/0137775 | A1 | 5/2014 | Plattner |
| 2014/0158025 | A1 | 6/2014 | Apps |
| 2015/0025190 | A1 | 1/2015 | Grinsteinner et al. |
| 2016/0039566 | A1 | 2/2016 | Lorenz |
| 2016/0368659 | A1 | 12/2016 | Bastian, II et al. |
| 2018/0141706 | A1 | 5/2018 | Storteboom et al. |
| 2018/0282017 | A1 | 10/2018 | Bastian et al. |
| 2018/0339803 | A1 | 11/2018 | Hawley et al. |
| 2019/0092621 | A1 | 3/2019 | Zimmerman et al. |
| 2019/0359378 | A1 | 11/2019 | White |
| 2019/0367212 | A1 | 12/2019 | D'Emidio et al. |

FOREIGN PATENT DOCUMENTS

| | | |
|---|---|---|
| EP | 2 733 084 A1 | 5/2014 |
| JP | H06 1236 U | 1/1994 |
| JP | 2004131162 A | 4/2004 |
| WO | WO 2016/154260 A1 | 9/2016 |
| WO | WO 2018/051155 A1 | 3/2018 |

OTHER PUBLICATIONS

Machine translation of JP2004131162A by Patent Translate European Patent Office dated Nov. 15, 2019 (pp. 19).

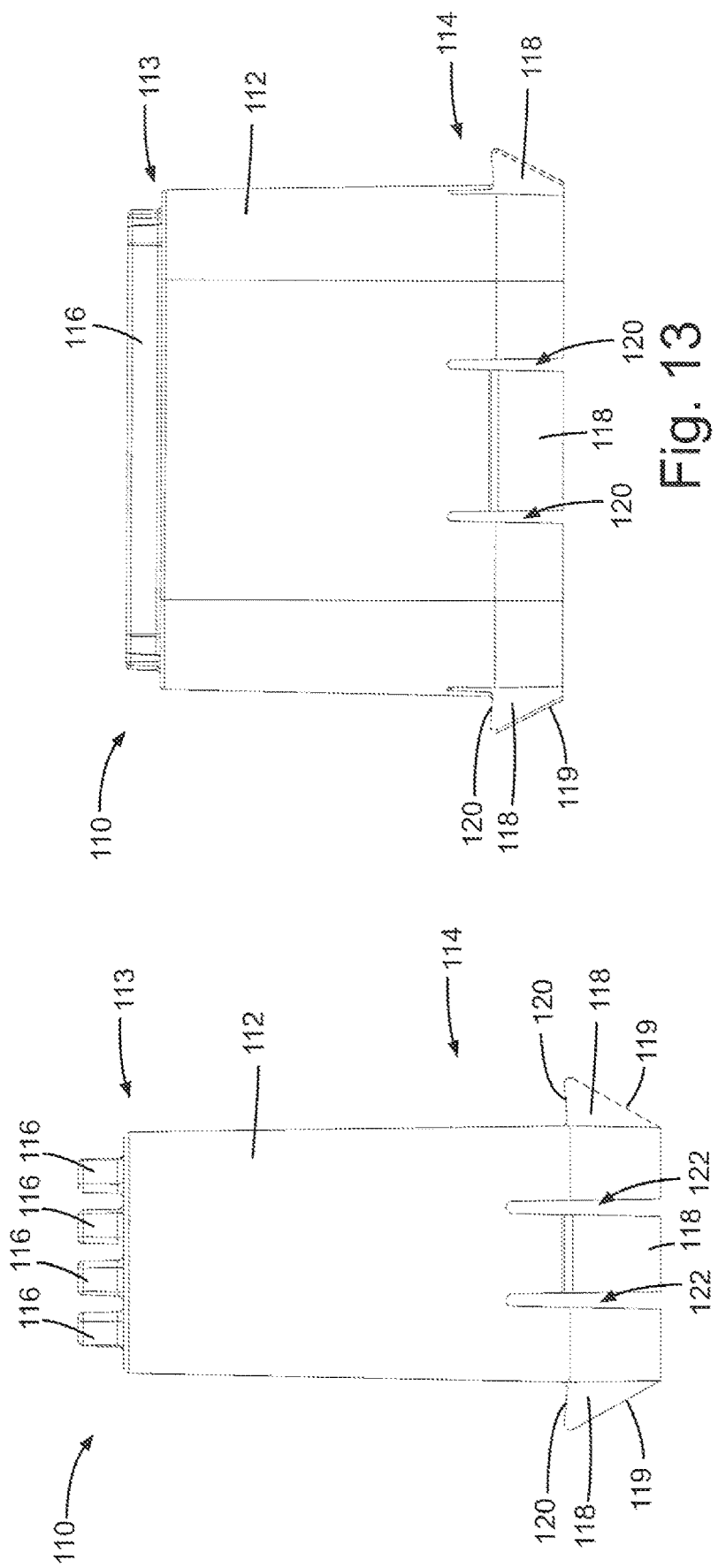

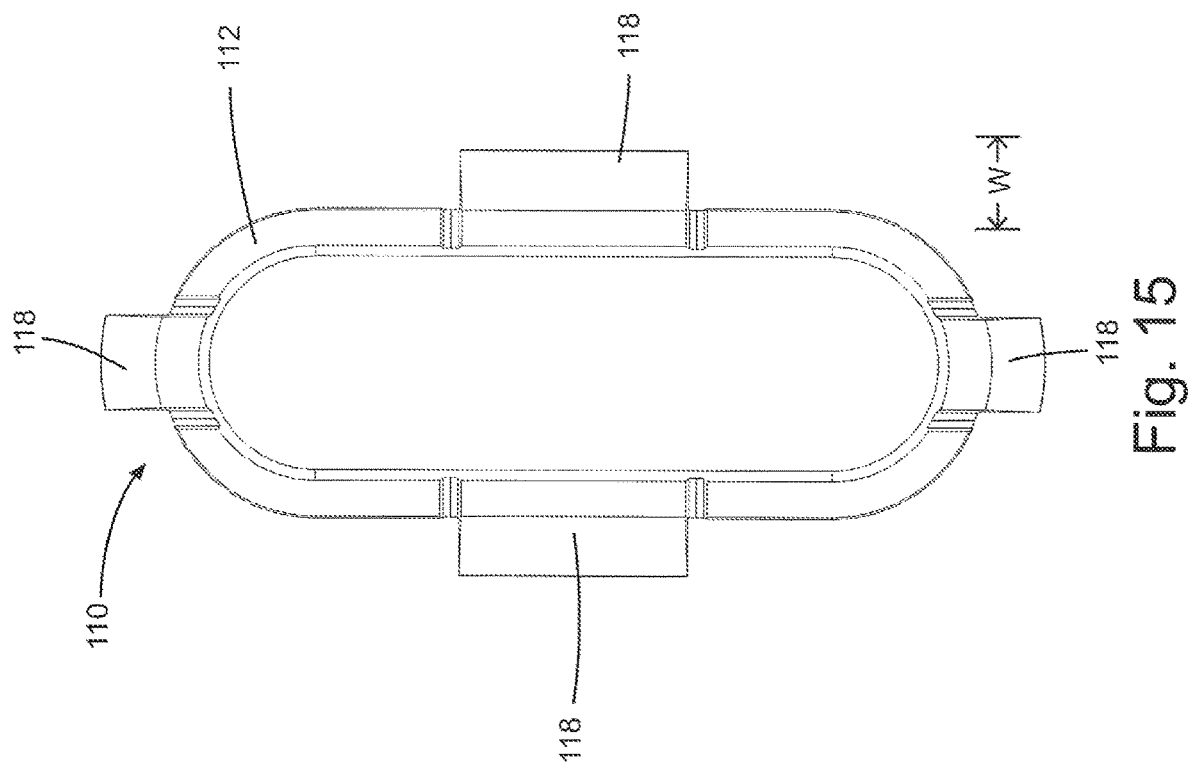
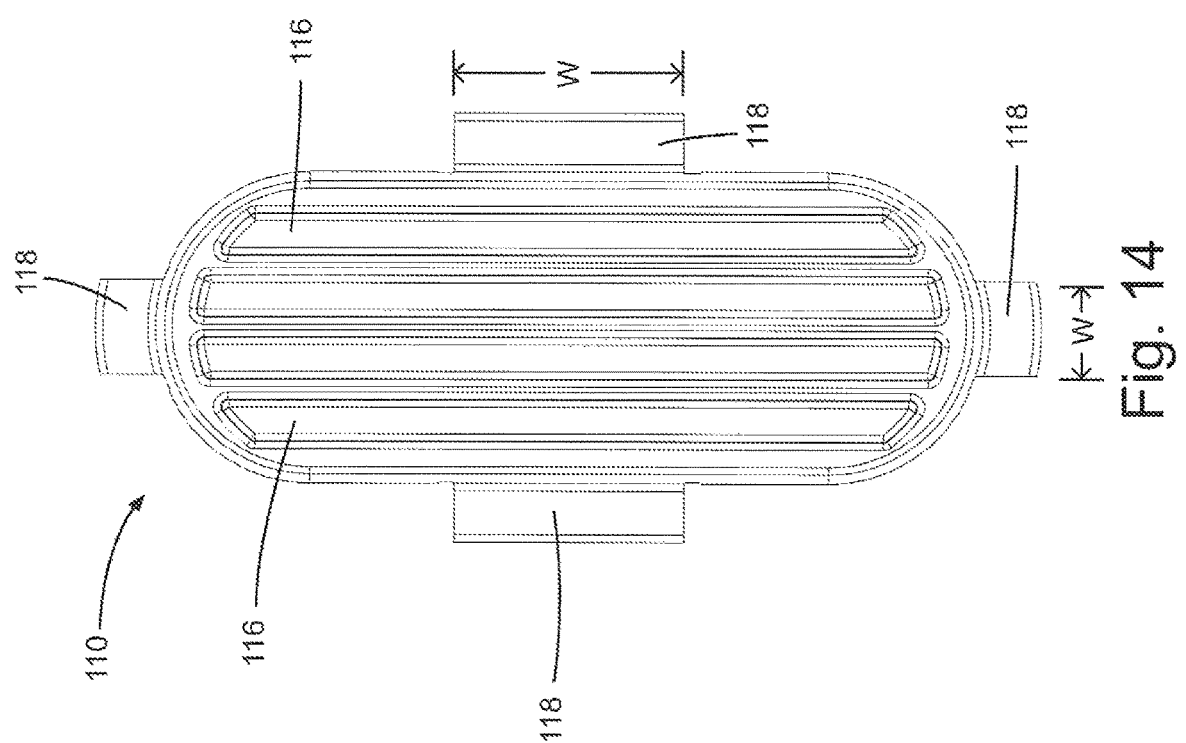

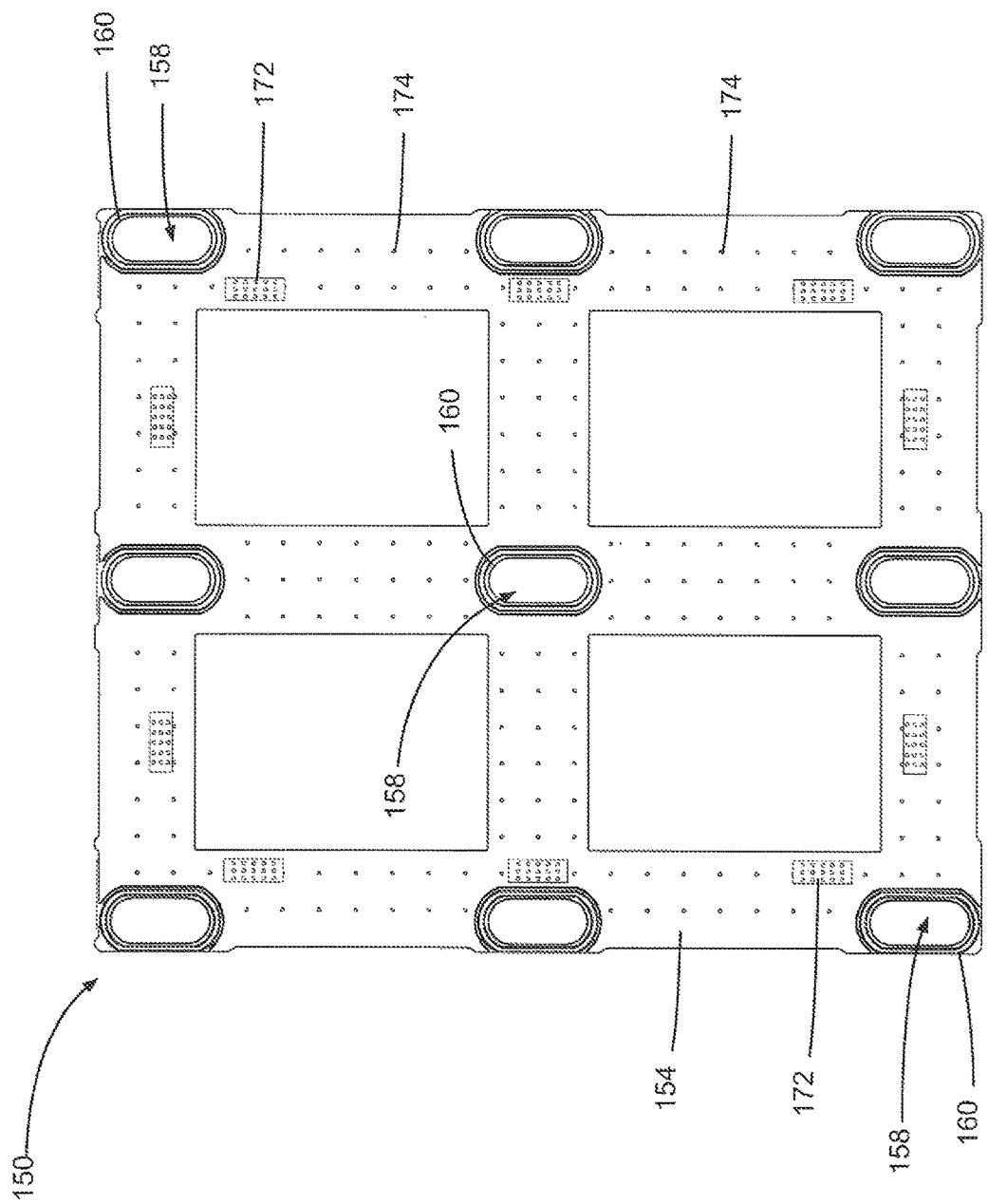

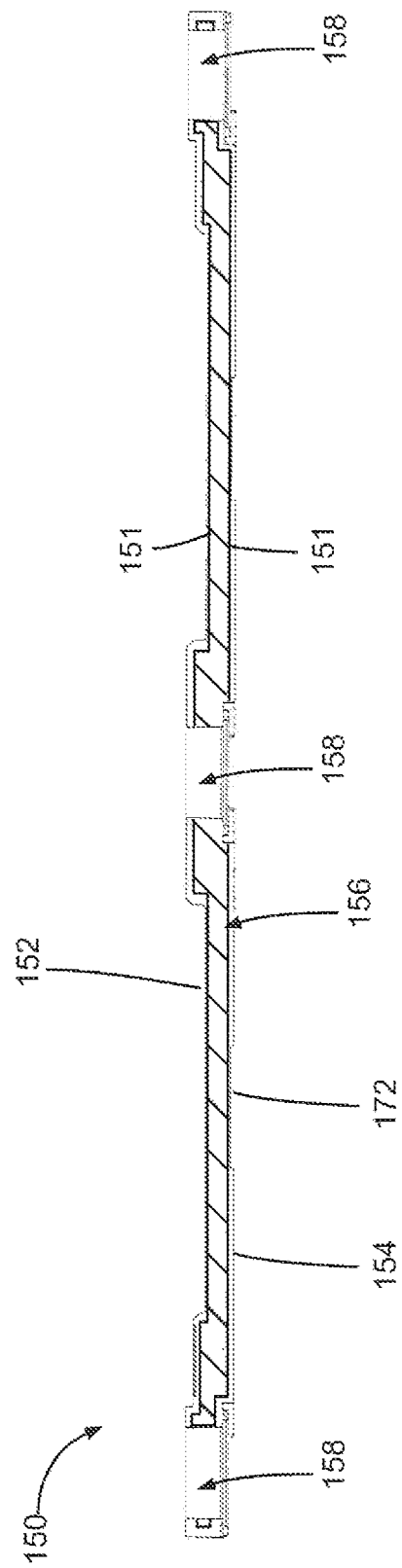

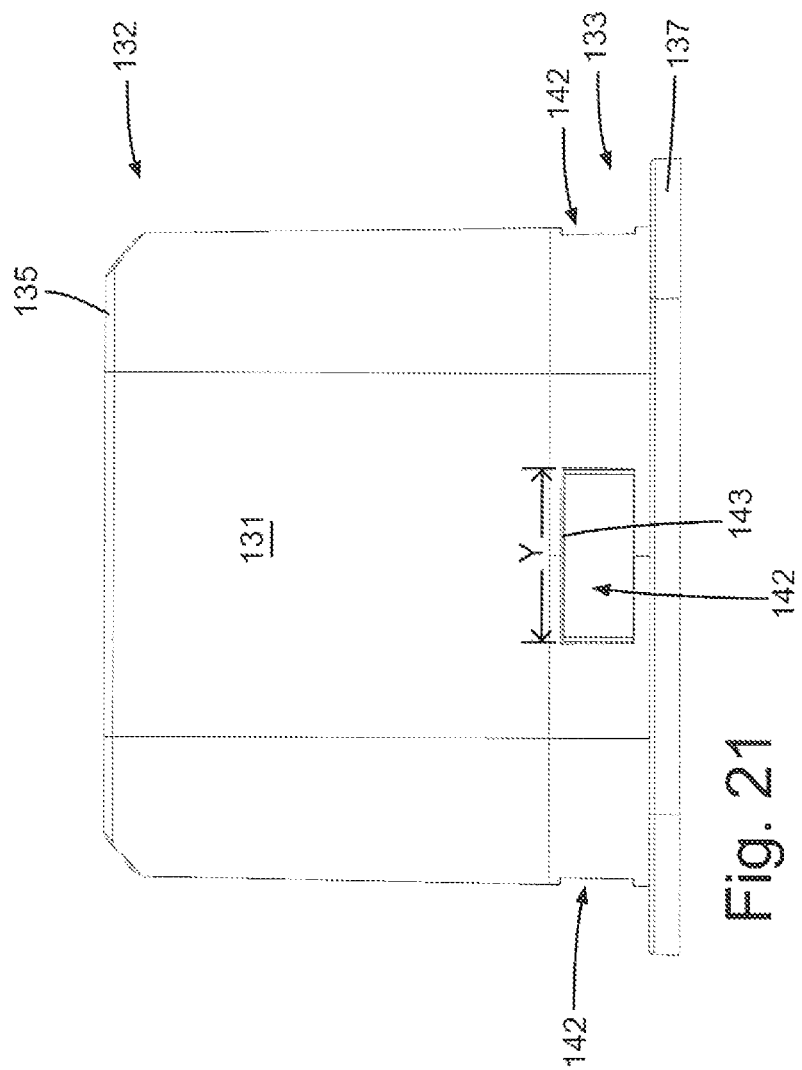
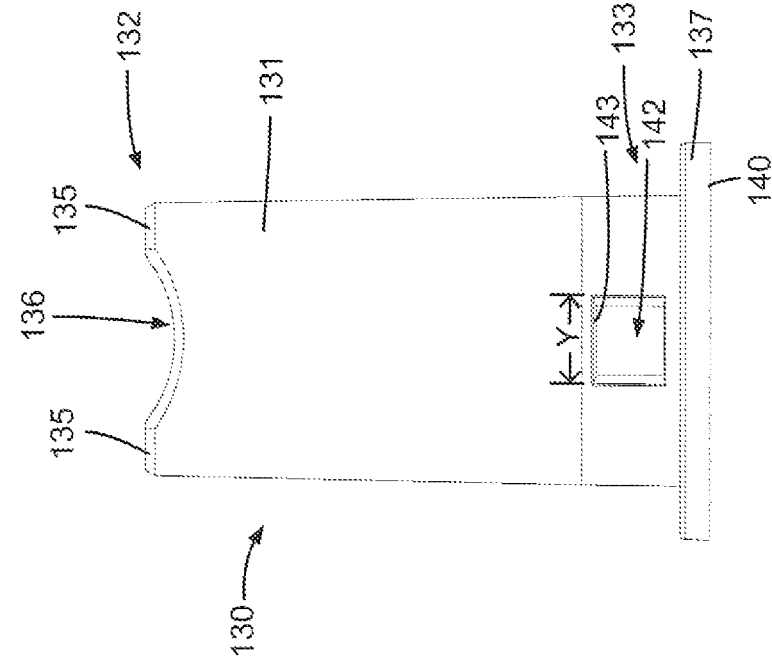
Fig. 21
Fig. 20

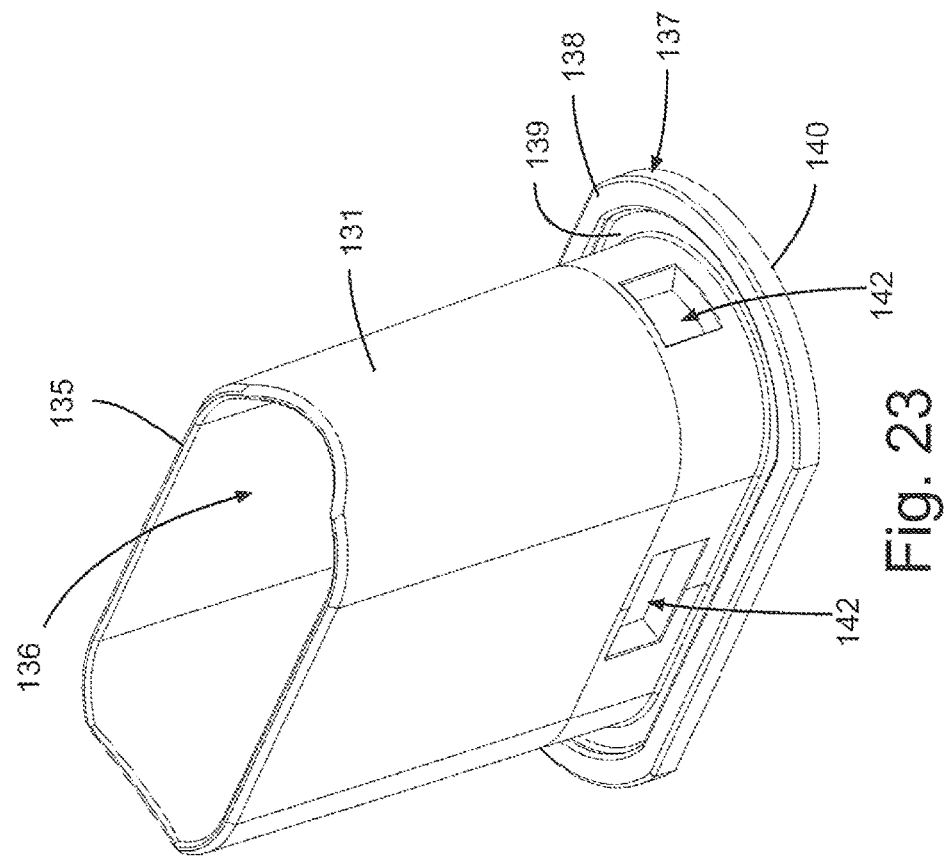
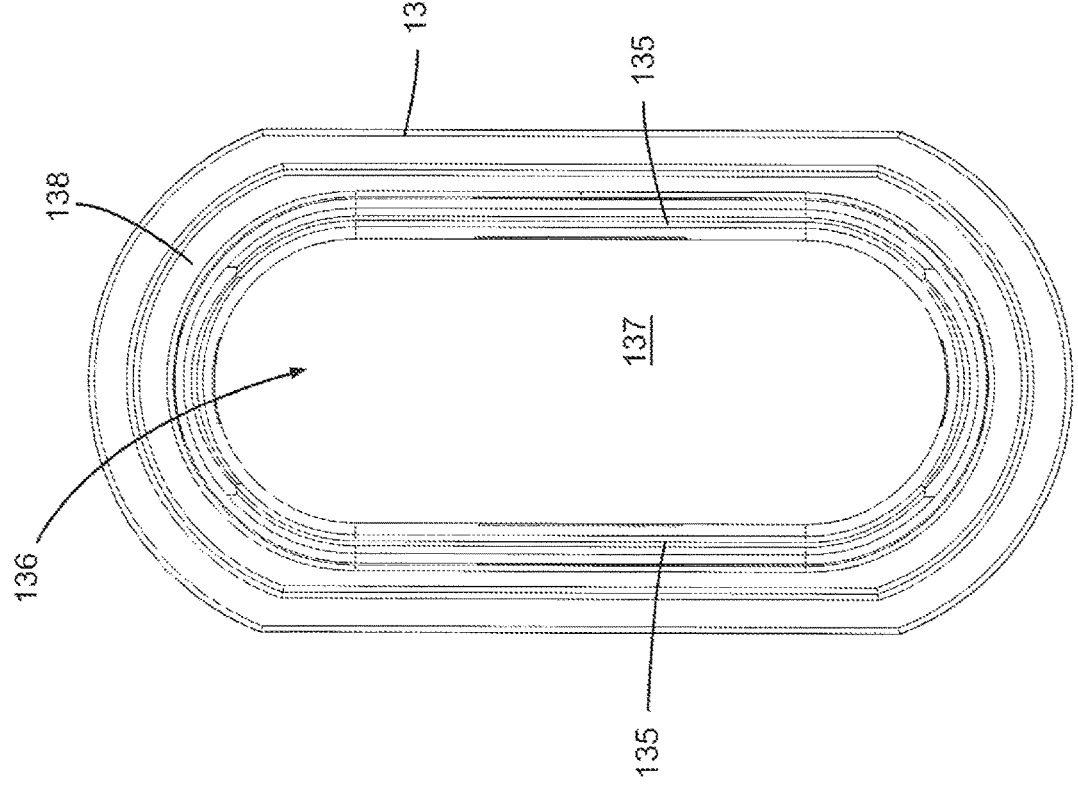
Fig. 23
Fig. 22

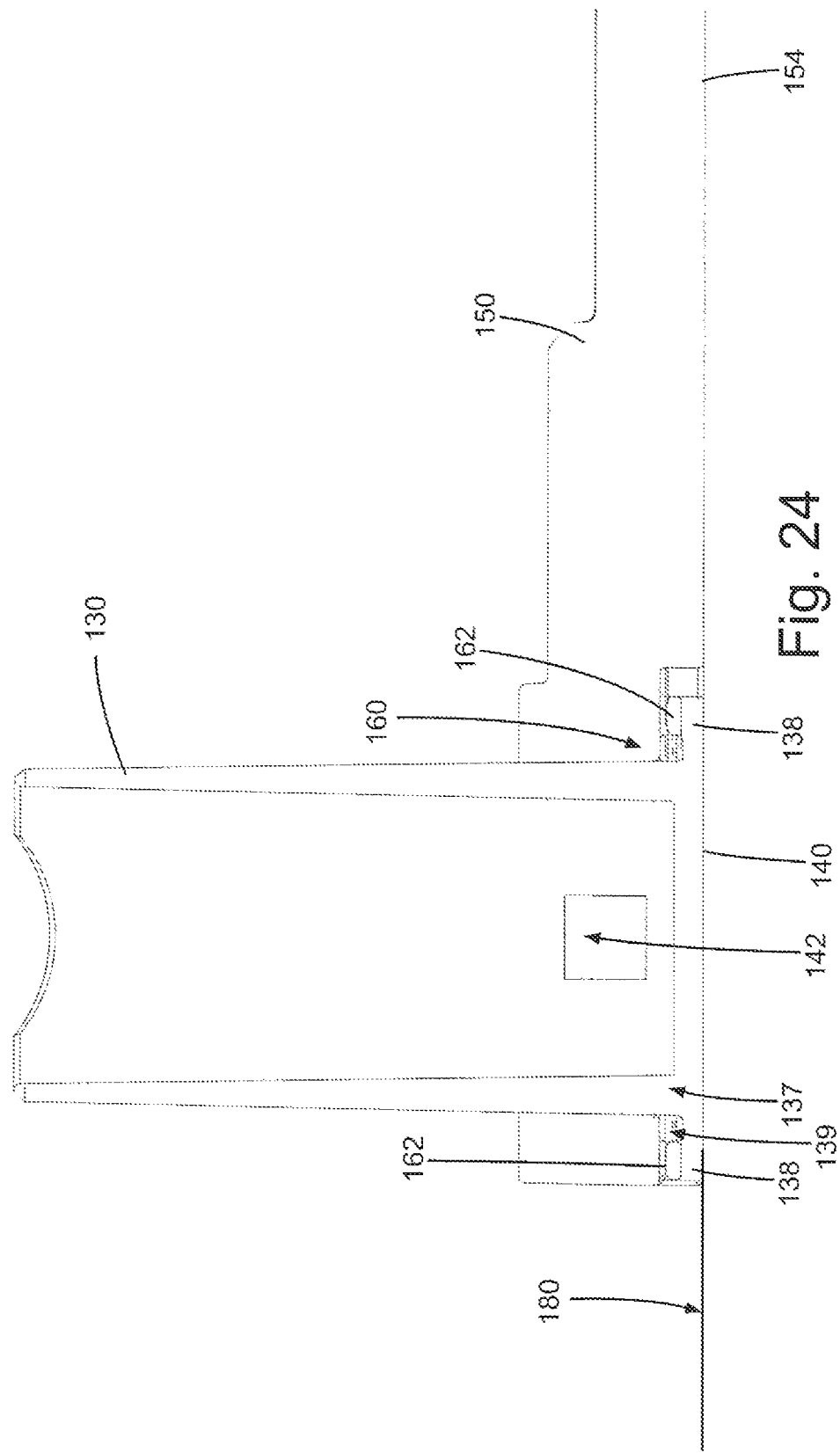

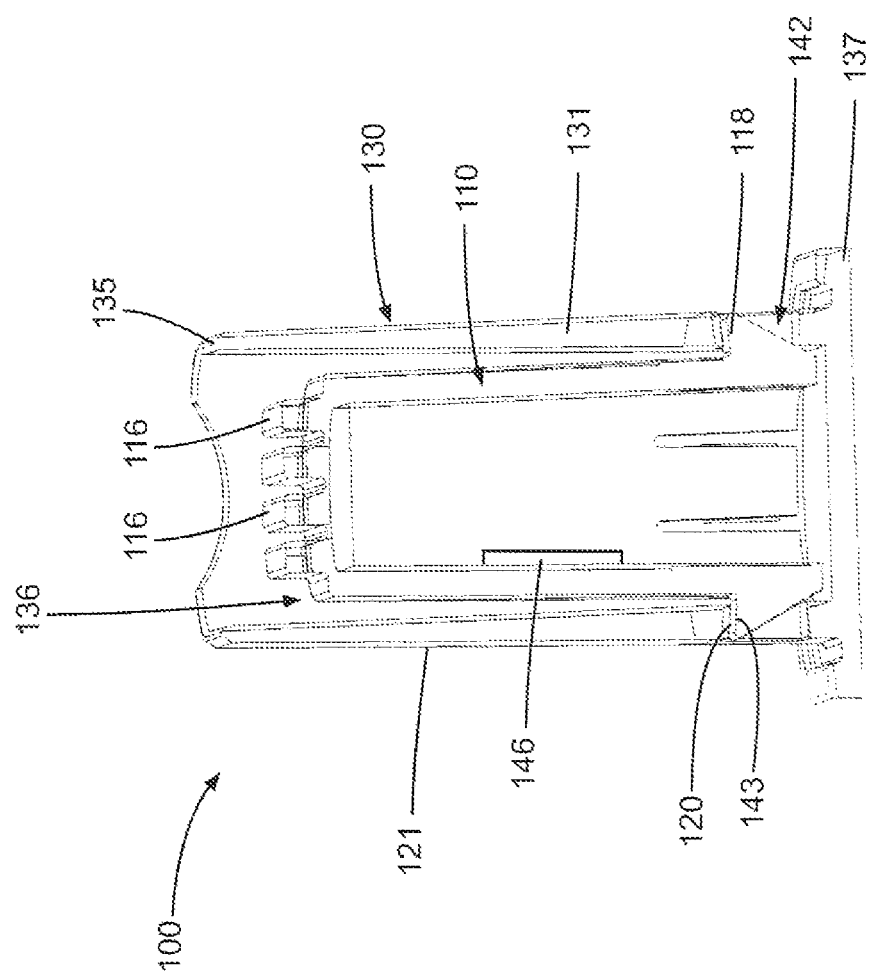

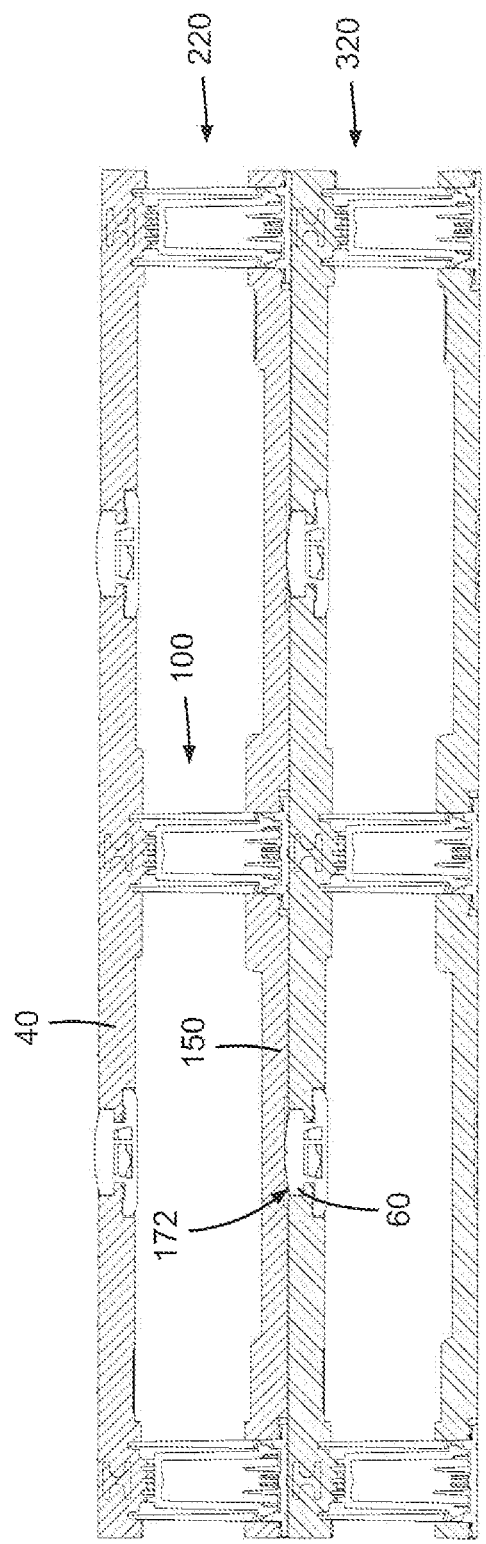
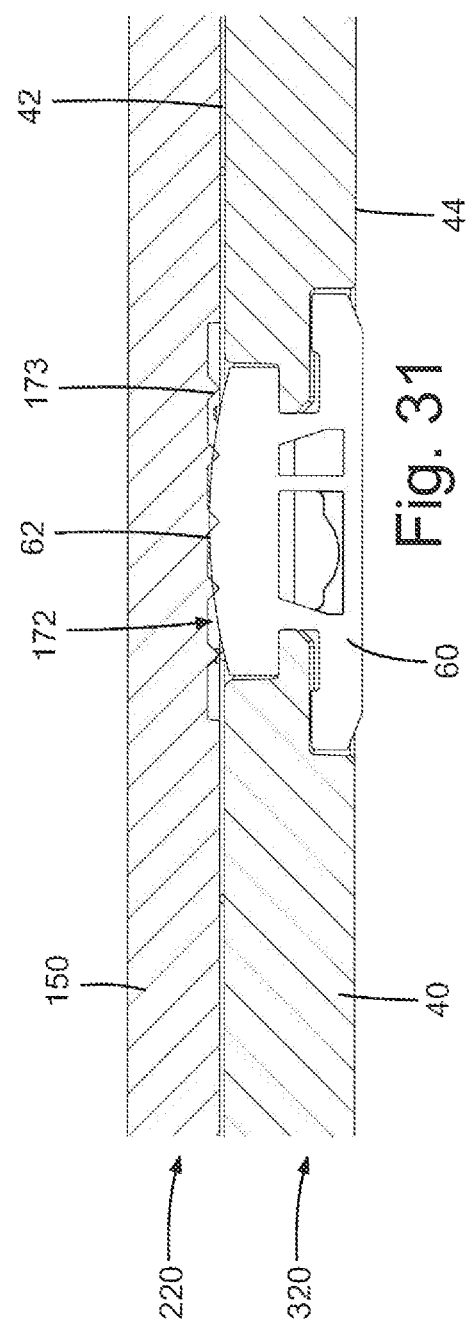

ROTO MOLDED PALLET

CROSS-REFERENCE TO RELATED APPLICATIONS

This application is a continuation of U.S. patent application Ser. No. 16/520,770 filed Jul. 24, 2019 which claims the benefit of U.S. Provisional Patent Application, Ser. No. 62/703,129 filed Jul. 25, 2018, which is hereby incorporated by reference.

BACKGROUND

This disclosure is in the field of plastic molded pallets.

Pallets are a commonly used structure that may support goods during transport while also allowing the goods to be lifted by a forklift, pallet jack, or other similar instrument. Pallets are commonly made from wood, but may also be made from other materials, such as plastic, metal, or concrete. In particular, plastic pallets may provide some advantages over other types of pallets. Plastic pallets are durable and have a long life span. They also may weigh less than a concrete or wooden pallet, reducing the cost of shipping. Additionally, plastic may be easier to clean or sterilize than a wooden or concrete pallet.

Because pallets are so widely used, they can represent a sizable expense in the shipping industry. Therefore it is beneficial to have a strong, durable pallet that is able to withstand the forces of the load that it is supporting as well as withstand forces from other objects such as a forklift or pallet jack without breaking.

BRIEF DESCRIPTION OF THE DRAWINGS

FIG. 12 is a front elevational view of a male fitting of the support assembly of FIG. 3.

FIG. 13 is a right side elevational view of the male fitting of FIG. 12.

FIG. 14 is a top plan view of the male fitting of FIG. 12.

FIG. 15 is a bottom plane view of the male fitting of FIG. 12.

FIG. 18 is a bottom plan view of a stringer of the base assembly of FIG. 16.

FIG. 19 is a cross-sectional front elevational view of the base assembly of FIG. 16 taken along line 19-19 of FIG. 17.

FIG. 20 is a front elevational view of a female fitting of the base assembly of FIG. 16.

FIG. 21 is a right side elevational view of the female fitting of FIG. 20.

FIG. 22 is a top plan view of the female fitting of FIG. 20.

FIG. 23 is a perspective view of the female fitting of FIG. 20.

FIG. 24 is a partial cross-sectional front elevational view of the base assembly of FIG. 16.

FIG. 25 is a cross-sectional front elevational view of a male fitting mated with a female fitting of the pallet assembly of FIG. 1.

FIG. 30 is a cross-sectional front elevational view of the stacked pallet assemblies of FIG. 28 taken along line 30-30 of FIG. 29.

FIG. 31 is a partial cross-sectional front elevational view of the interface between a first pallet assembly stacked on a second pallet assembly.

DETAILED DESCRIPTION OF THE DRAWINGS

Figure 1:
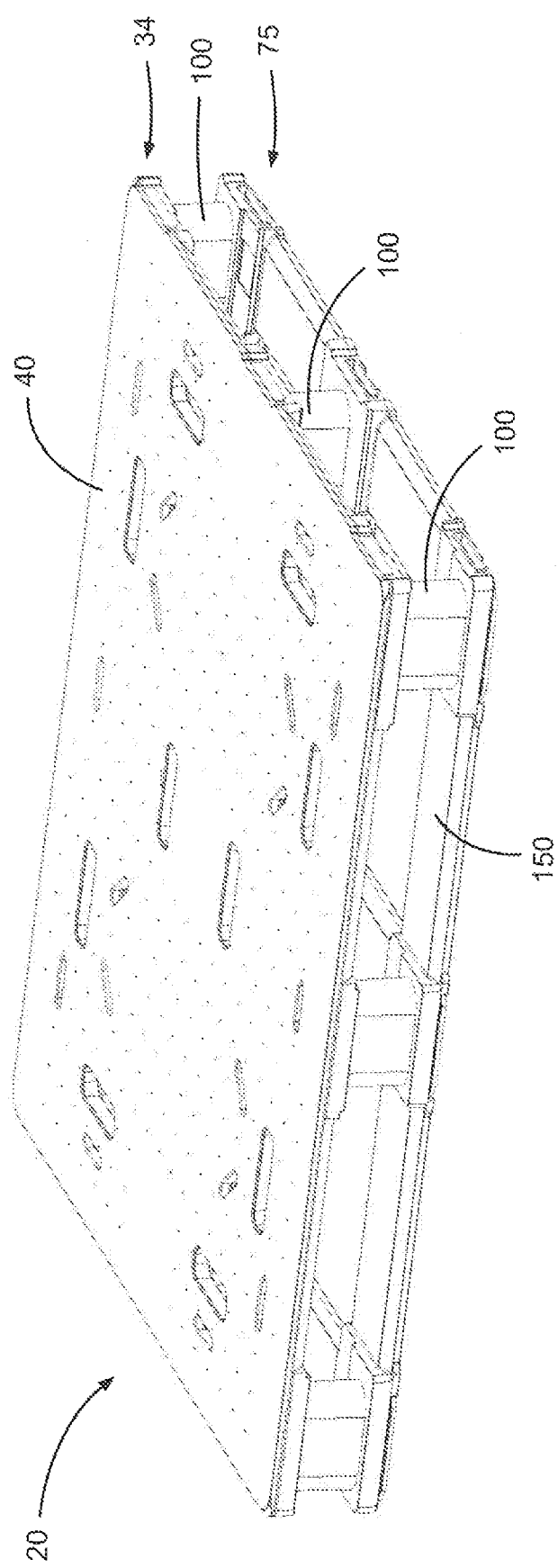
FIG. 1 is a perspective view of a pallet assembly.

Reference will now be made to certain embodiments and specific language will be used to describe the same. It will nevertheless be understood that no limitation of the scope of this disclosure and the claims is thereby intended, such alterations, further modifications and further applications of the principles described herein being contemplated as would normally occur to one skilled in the art to which this disclosure relates. In several figures, where there are the same or similar elements, those elements are designated with the same or similar reference numerals.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

FIG. 1 is a perspective view of a pallet assembly 20. Pallet assembly 20 includes a deck 40 and a stringer 150 that is parallel to deck 40. A plurality of block assemblies 100 extend between deck 40 and stringer 150. Each block assembly includes a male fitting 110 and a female fitting 130 (see FIG. 2). One end of each block assembly 100 is attached to deck 40 and the other end of each block assembly 100 is attached to stringer 150.

Figure 2:
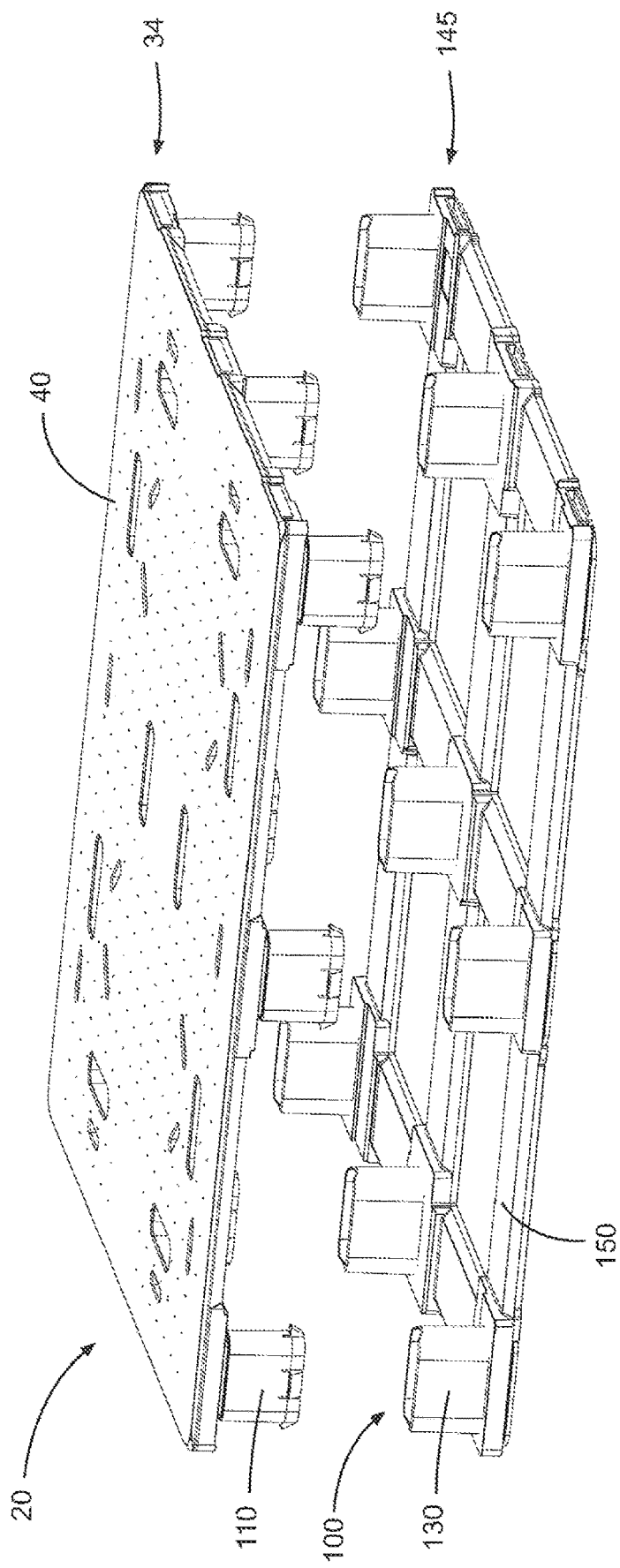
FIG. 2 is an exploded view of the pallet assembly of FIG. 1

As shown in FIG. 2, pallet assembly 20 includes a support assembly 34 and a base assembly 75. Support assembly 34 includes deck 40 and male fittings 110 of block assembly 100. Male fittings 110 are attached to deck 40, for example by welding male fittings 110 to deck 40. Base assembly 75 includes stringer 150 and female fittings 130 of block assembly 100. Female fittings 130 are attached to stringer 150, for example by welding female fittings 130 to stringer 150.

Each male fitting 110 is sized to be capable of fitting within cavity in a corresponding female fitting 130. Each of the male fittings 110 in support assembly 34 are fit within a female fitting 130 in base assembly 75 to connect deck 40 to stringer 150.

Figure 3:
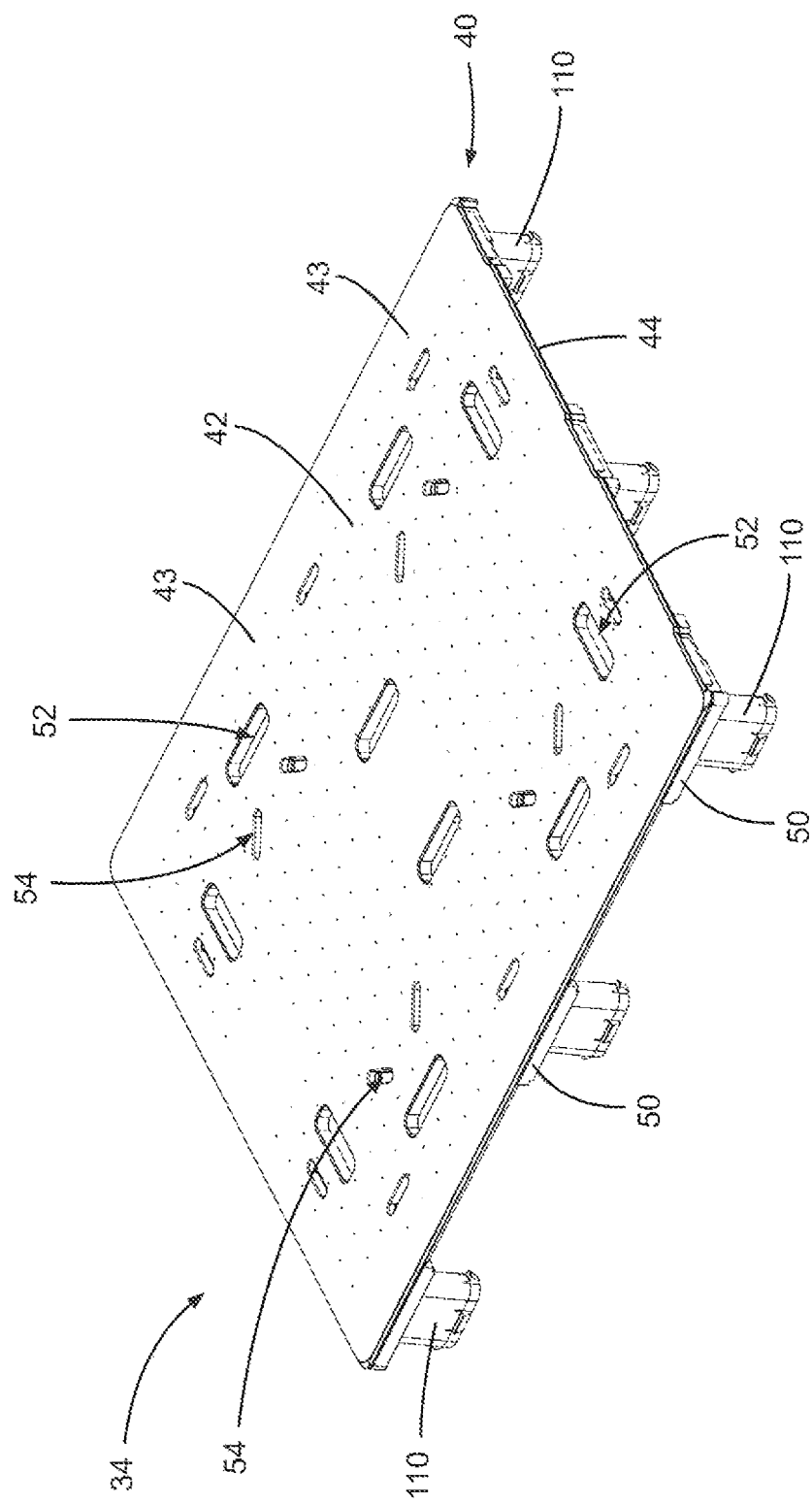
FIG. 3 is a top perspective view of a support assembly, a component of the pallet assembly of FIG. 1.
Figure 11:
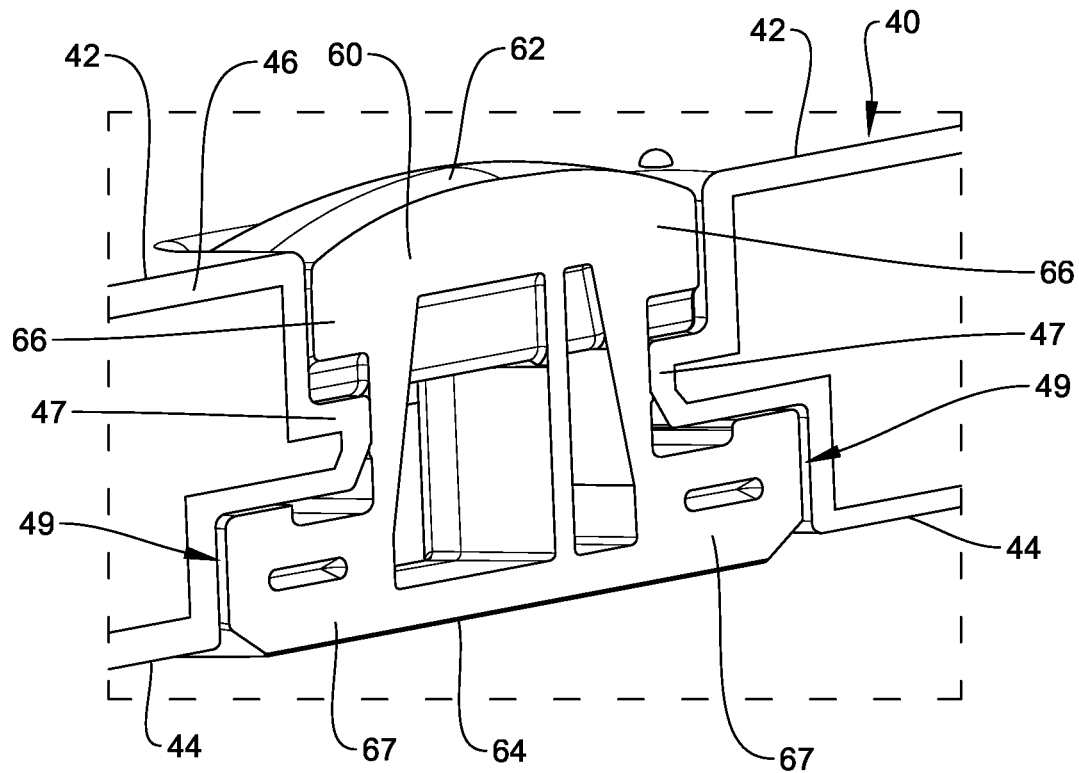
FIG. 11 is a partial cross-sectional perspective view of the support assembly of FIG. 3 taken along line 7-7 of FIG. 4 showing a resilient insert inserted into an aperture.

Deck 40 includes a shell 46 that encloses an internal cavity 45 (see FIG. 11). As shown in FIG. 3, deck 40 has an upper surface 42 and a lower surface 44 and a deck thickness defined between the upper surface 42 and the lower surface 44. Internal cavity 45 may be accessed through fill ports 50 located on the sides of deck 40. Each fill port 50 includes a plug that prevents access to internal cavity 45 and helps keep a support material within internal cavity 45 when pallet assembly 20 is in use. Male fittings 110 may be attached to and extend from the lower surface 44 of deck 40.

Typically, deck 40 is molded from a plastic or another suitable composite material. As an example, deck 40 may have a multi-layer, multi-polymer construction for strength and rigidity. In some embodiments, deck 40 may have an external layer of linear low density polyethylene (LLDPE). The layered structure of deck 40 allows additives for improved performance to be added to the external layer without affecting the structure of the core material.

After molding, a support material may be used to fill the internal cavity 45. The support material may be more rigid than the material used for deck 40 to provide pallet assembly 20 with additional strength. In some embodiments, high density polyethylene (HDPE) is used as a support material that fills or substantially fills internal cavity 45 defined within deck 40. In other embodiments, the support material is a foamed material that provides increased strength and rigidity but also is lighter than a solid material, to minimize the overall weight of pallet assembly 20. Additional support materials may be used to create a mixture of plastic and non-plastic materials that is used as the support material. As an example, these additional filler materials may be crushed minerals, silica sand, fibers, porous materials such as pumice and flue ash, and/or filler material as described in any of U.S. Pub. No. 2007/0063381, U.S. Pub. No. 2008/0110377, or U.S. Pat. No. 9,138,945.

As shown in FIG. 3, apertures 52, 54 are defined in and extend through deck 40. Each of the apertures 52, 54 extend through upper surface 42 of deck 40 and also through lower surface 44 of deck 40. Interior walls define the sides of apertures 52, 54 and maintain the hermetic seal of internal cavity 45.

Figure 4:
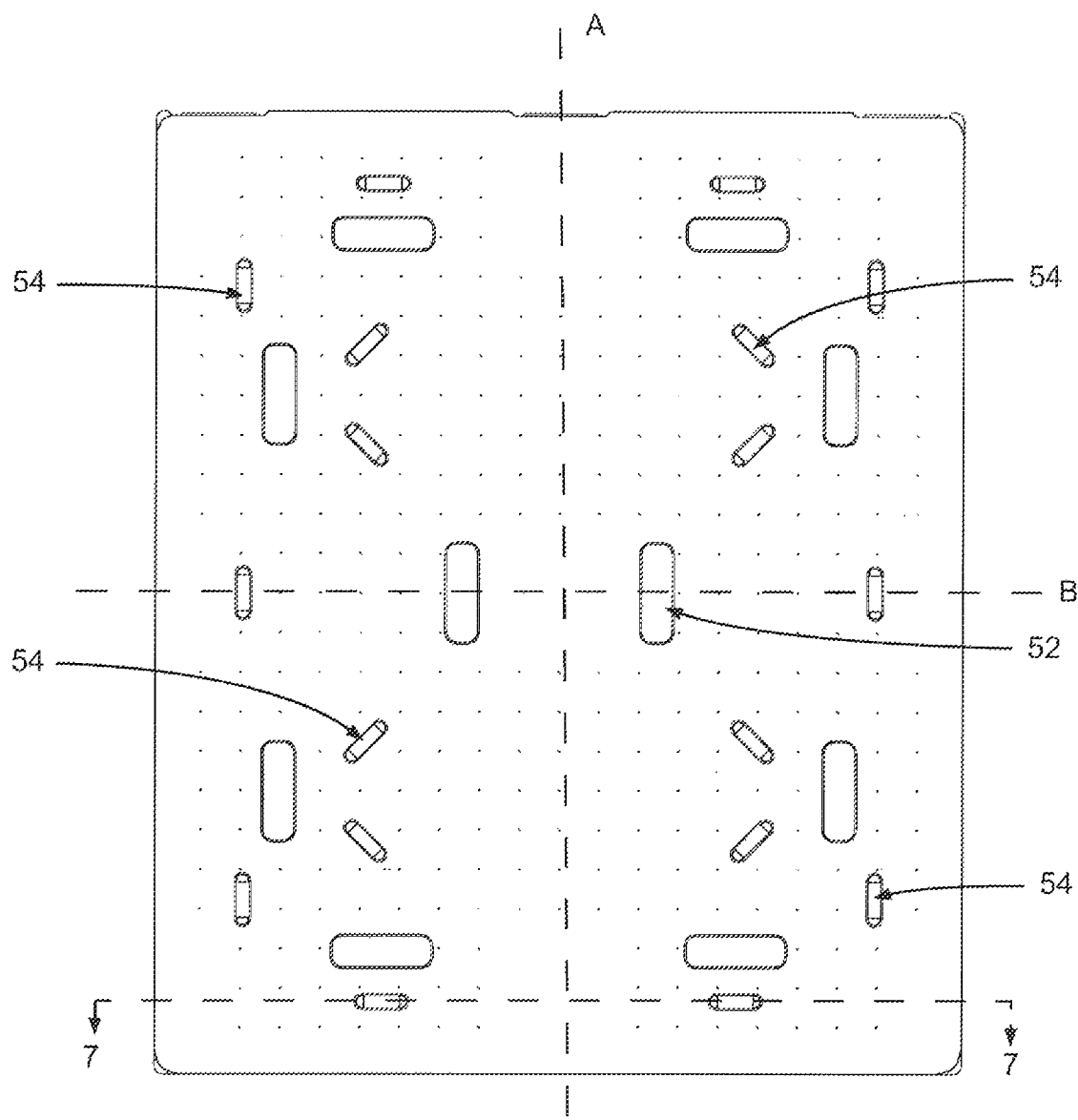
FIG. 4 is a top plan view of the support assembly of FIG. 3.

Hand hold apertures 52 are generally larger than insert apertures 54 that receive resilient inserts 60. The larger hand hold apertures 52 may be configured for use as hand holds to assist in manually carrying pallet assembly 20. As shown in FIG. 4, several sets of hand hold apertures 52 may be arranged on deck 40 to allow pallet assembly 20 to be carried in different orientations. A pair of hand hold apertures 52 may be positioned near each edge of deck 40 to allow a user to carry pallet assembly 20 at that adjacent edge. Additional hand hold apertures 52 may be positioned in the middle of deck 40 to allow a user to pick up pallet assembly 20 at its center. Other embodiments may include additional hand hold apertures 52 or may include fewer apertures 52 than what is shown in FIG. 3.

Upper surface 42 and apertures 52, 54 form a support area for objects or items placed on support assembly 34. In some embodiments, the number and size of hand hold apertures 52 and insert apertures 54 may be limited so that at least 90 percent of the support area is formed by the upper surface 42 and five percent or less of the support area is made up of apertures 52, 54. Other embodiments may have different ratios of surface to apertures. For example, in some embodiments, upper surface 42 may make up at least 90 percent of the support area and apertures 52, 54 may comprise 10 percent or less of the support area. Pallet assembly 20 may be governed by the Grocery Manufacturing Association (GMA) specifications. The rigid support material inserted into internal cavity 45 provides increased strength and support to the entire support area defined by upper surface 42. This increased strength and support helps reduce sagging and deformation of deck 40 in areas that are not supported by male fittings 110.

As shown in FIG. 4, insert apertures 54 may be distributed over deck 40. Insert apertures 54 are designed to hold a resilient insert 60 that may help protect deck 40 by absorbing some of the compression force of objects placed on upper surface 42 of deck 40 and may prevent slippage of objects placed on upper surface 42. The position and the number of insert apertures 54 may be varied as desired. Some insert apertures 54 may be positioned near the edge of deck 40 while other insert apertures 54 may be positioned closer to the center of deck 40.

In some embodiments, some of the insert apertures may be positioned midway between adjacent male fittings 110. Additionally, the orientation of insert apertures 54 may also be varied. For example, in the embodiment shown, deck 40 includes a longitudinal axis A and a latitudinal axis B positioned on the plane of deck 40. Some of the insert apertures 54 may be parallel to longitudinal axis A, while other insert apertures 54 may be parallel to latitudinal axis B. Still other insert apertures 54 may be oblique to both longitudinal axis A and latitudinal axis B. In the embodiment shown in FIG. 4, some insert apertures 54 are oriented at approximately a 45 degree angle with respect to longitudinal axis A or latitudinal axis B.

Figure 5:
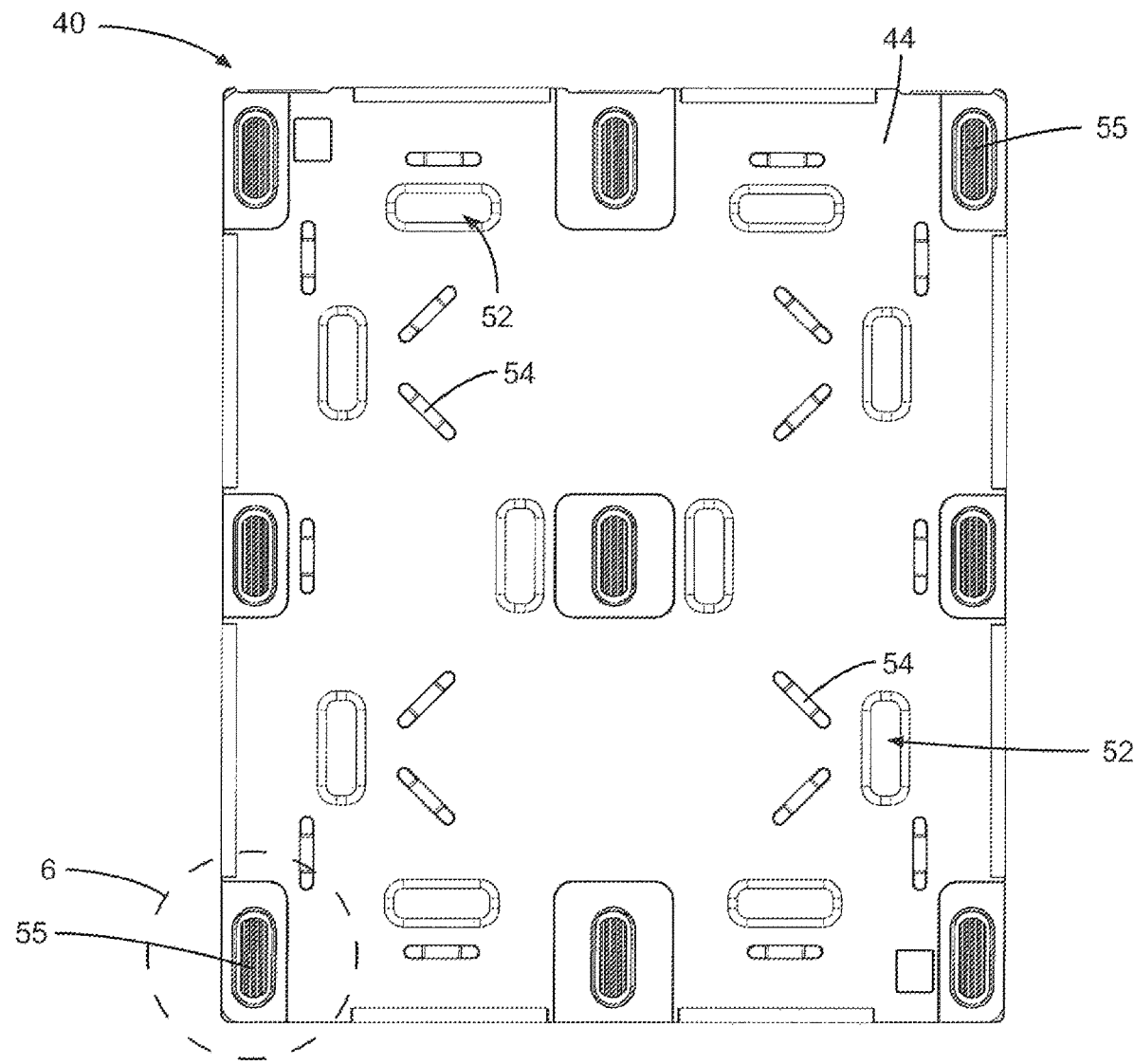
FIG. 5 is a bottom plan view of the support assembly of FIG. 3.
Figure 6:
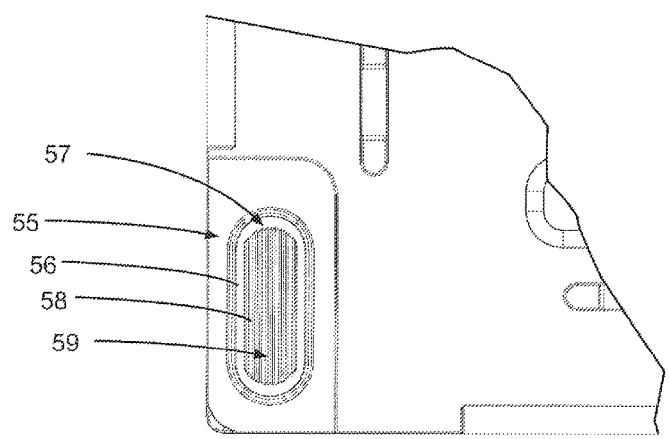
FIG. 6 is a bottom plan view of a fitting attachment section of the support assembly of FIG. 3.

A bottom view of deck 40, illustrated in FIG. 5, shows lower surface 44. In addition to hand hold apertures 52 and insert apertures 54 extending through lower surface 44, the lower surface 44 of deck 40 also includes fitting attachment sections 55 for attaching male fittings 110 to deck 40. Each fitting attachment section 55 includes a body portion 56 that is surrounded by a groove 57 (see FIG. 6). Groove 57 is positioned so that a portion of female fitting 130 may extend into groove 57 when support assembly 34 is coupled to base assembly 75. An arrangement of flanges 58 extend from body portion 56, forming channels 59 between adjacent flanges 58.

Reinforcement members 35, such as a support bar, may be positioned within the hermetically sealed internal cavity 45 to provide additional load bearing support and to increase the rigidity and strength of deck 40. Reinforcement members 35 are fully surrounded by the support material that fills internal cavity 45 and are encapsulated within deck 40 by the support material, providing additional support and stiffness. Total encapsulation of the reinforcement members 35 helps prevent the reinforcement members 35 from being damaged by the environment, binds reinforcement member 35 to deck 40, and prevents the reinforcement members 35 from being unintentionally removed.

Figure 7:
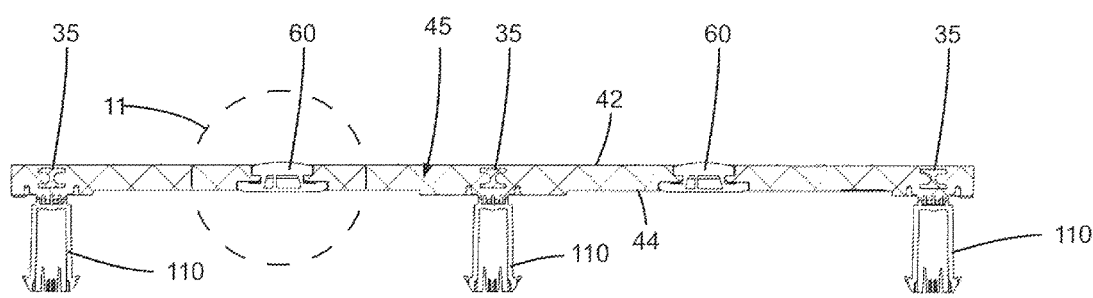
FIG. 7 is a cross-sectional right elevational view of the support assembly of FIG. 3 taken along line 7-7 of FIG. 4.

In the embodiment shown in FIG. 7, three reinforcement members 35 run along the length of deck 40. Each reinforcement member 35 is positioned above the attachment point of a row of male fittings 110. In other embodiments, reinforcement members 35 may be used in different arrangements to modify the weight distribution and loading capacity of pallet assembly 20 as desired. In the illustrated configuration, reinforcement members 35 assist in transferring loads on deck 40 to male fittings 110. The reinforcement members 35 may be positioned in different arrangements or the size of the reinforcement members 35 may be modified. As an example, the size of the reinforcement members 35 may be varied to extend substantially the entire height and/or width of deck 40.

Figure 8:
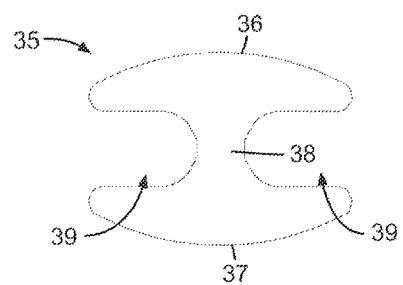
FIG. 8 is a front elevational view of a reinforcement member of the support assembly of FIG. 3.

As shown in FIG. 8, each of the reinforcement members 35 has a top portion 36 and a bottom portion 37 connected by a middle portion 38 defining an I-beam shape. The top portion 36 and bottom portion 37 of reinforcement member 35 each have a greater width than middle portion 38 so that gaps 39 are defined between the top portion 36 and bottom portion 37.

The I-beam shape allows the support material used to fill internal cavity 45 to fill in gaps 39 between the top portion 36 and bottom portion 37 of reinforcement member 35 to improve structural interlock between the reinforcement member 35 and deck 40. The surfaces of reinforcement member 35 may be rounded to help ensure that the entire surface of the reinforcement member 35 is surrounded by the support material filling internal cavity 45.

Figure 9:
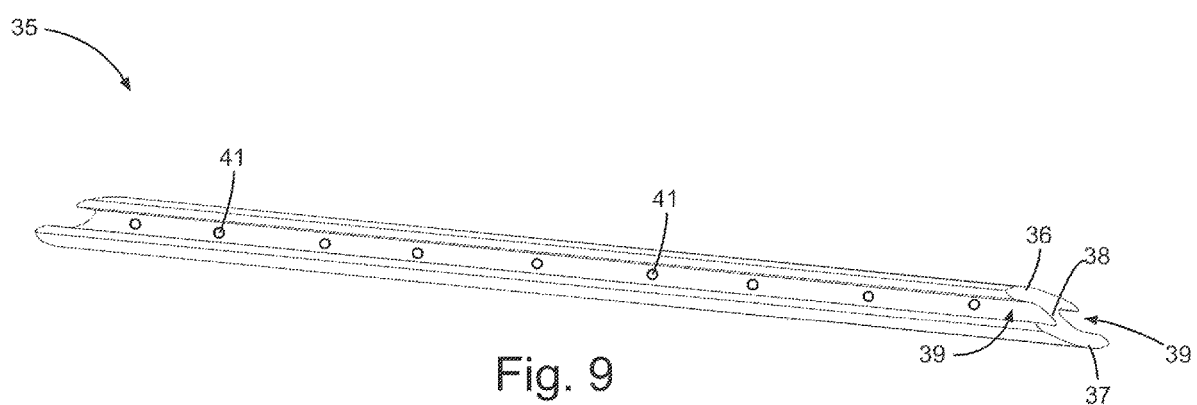
FIG. 9 is a perspective view of the reinforcement member of FIG. 8.

Additionally, holes 41 (shown in FIG. 9) may be defined along the length of reinforcement member 35. Support material may fill these holes to further increase structural interlock between reinforcement member 35 and deck 40. The ends of the reinforcement member 35 may also be angled or slanted to avoid distorting or wrinkling the surface of deck 40 during the rotational molding process.

In alternative embodiments, reinforcement members 35 may have other shapes. For example, reinforcement member 35 may have a square or rectangular cross-section or may be shaped like an I-beam. Additionally, although three reinforcement members 35 are shown in internal cavity 45 in FIG. 7, other embodiments may include more or fewer reinforcement members 35.

Figure 10:
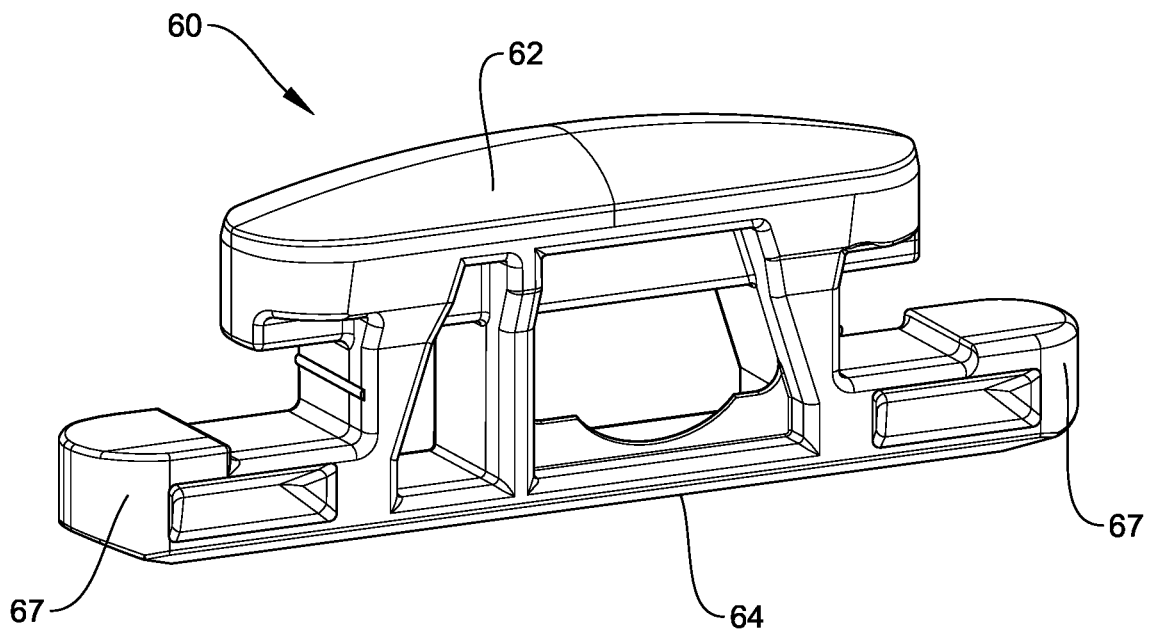
FIG. 10 is a top perspective view of an insert.

In some embodiments, resilient inserts 60, shown in FIG. 10, may be positioned within insert apertures 54. Resilient insert 60 includes an upper face 62 and a lower face 64. The bottom portion of resilient insert 60 includes a pair of feet 67 extending from lower face 64. Resilient insert 60 may be made from rubber or another suitable, resilient material. Resilient inserts 60 are more resilient than deck 40.

Resilient insert 60 is shown within an insert aperture 54 in FIG. 11. Upper face 62 of resilient insert 60 protrudes away from upper surface 42 of deck 40. Lower face 64 protrudes from, or alternatively may be flush with, lower surface 44 of deck 40. The protruding upper face 62 may serve as a contact surface for items placed on support assembly 34 and may help prevent damage to deck 40. Additionally, resilient insert 60 may provide a higher coefficient of friction than upper surface 42 of deck 40 to help reduce movement of any item or items placed on support assembly 34.

Resilient insert 60 extends from upper face 62 to a pair of flanges 66. When resilient insert 60 is inserted into insert aperture 54, flange 66 contacts and rests on shoulders 47 extending from deck 40, blocking resilient insert 60 from falling through insert aperture 54. Feet 67 extend from lower face 64 of resilient insert 60 and fit into recesses 49 in deck 40.

Resilient inserts 60 and apertures 54 may be configured to avoid retaining liquid on deck 40. In the illustrated embodiment, the fit between flanges 66 and shoulders 47 is not tight enough to provide a seal from liquids that may be present on upper surface 42 of deck 40. Additionally, the fit between feet 67 and recesses 49 in the illustrated embodiment is designed to allow liquid on upper surface 42 to drain by leaving a gap between lower surface 44 and foot 67. Alternatively, resilient inserts 60 may be configured to fit in recesses 49 to block the flow of liquids through recesses 49.

Although FIG. 7 shows a certain embodiment of a resilient insert 60 and its placement within a insert aperture 54 in deck 40, in other embodiments, any other suitable attachment arrangements may be used. For example, resilient insert 60 may be rectangular and be held in insert aperture 54 by a friction fit. In other embodiments, resilient insert may be adhered to deck 40 within insert aperture 54.

FIGS. 12-15 illustrate various views of a male fitting 110. Male fitting 110 includes a body 112. A set of flanges 116 are attached to a top portion 113 of body 112. Flanges 116 may be used as the attachment point for attaching male fitting 110 to deck 40 and may be sized to correspond to the flanges 58 on the fitting attachment section 55 of deck 40.

A bottom portion 114 of body 112 includes a set of projections 118, where one projection extends from each side of body 112. The embodiment of male fitting 110 shown in FIGS. 12-15 has a body 112 with a race track type shape with long straight sides and circular ends, and the projections 118 on the longer sides of body 112 have a greater width, W, than the projections 118 on the shorter sides of body 112. In other embodiments, projections 118 may all be the same width. Additionally, in other embodiments, there may be a fewer number of projections 118 or a greater number of projections 118 as desired.

Each projection includes an angled surface 119 that extends to a flat top surface 120. A channel 122 is positioned on each side of projection 118. Channels 122 allow projection 118 to flex independently of the rest of body 112 upon application of force to projection 118. Projection 118 may then snap back into its original position upon release of the force due to the resiliency of the material used to form projection 118.

Figure 16:
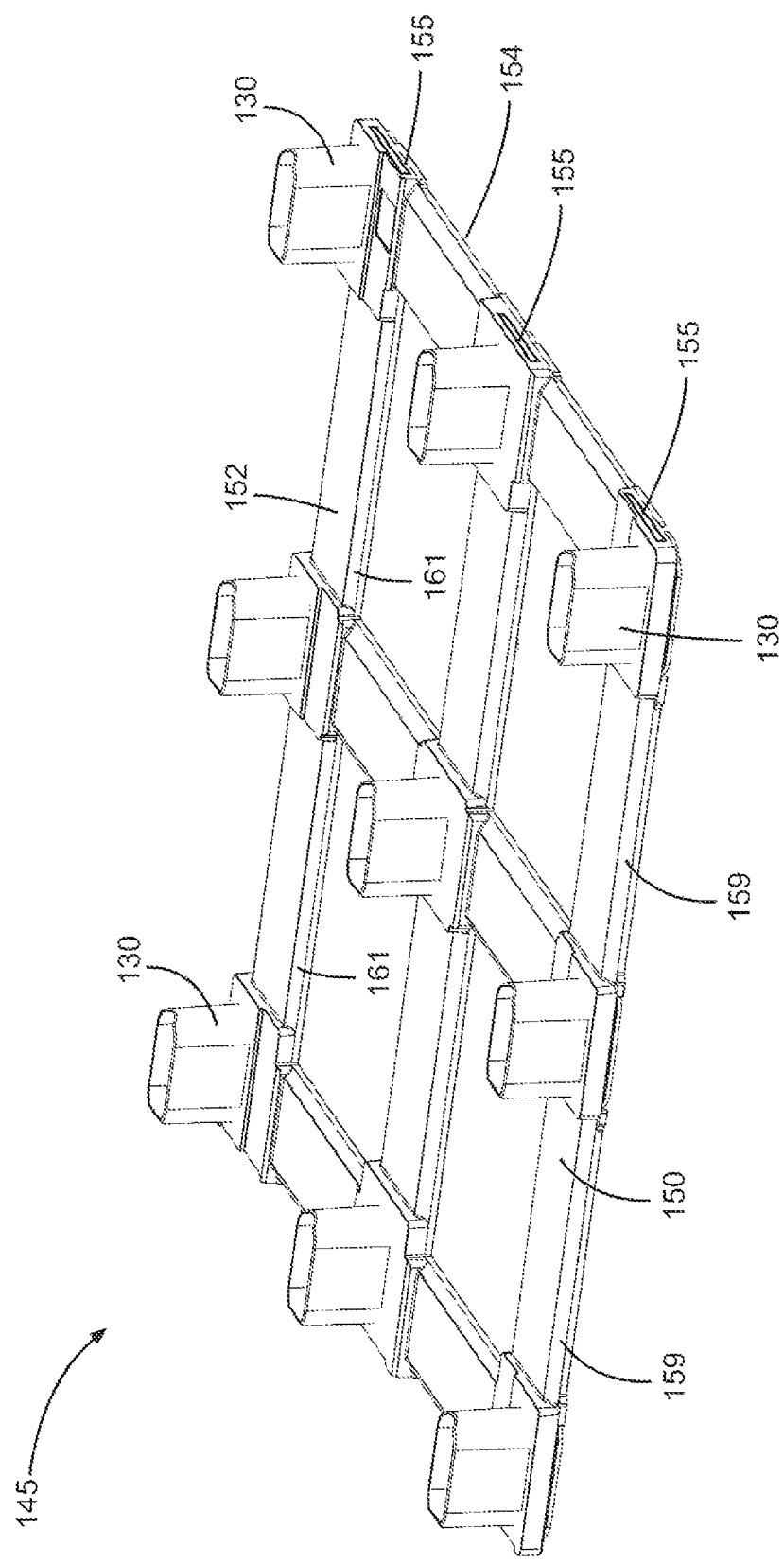
FIG. 16 is a perspective view of a base assembly, a component of the pallet assembly of FIG. 1.

Base assembly 145 is shown in FIG. 16. Base assembly 145 includes a stringer 150 and female fittings 130 extending from stringer 150. Stringer 150 includes a top surface 152 and a bottom surface 154. In some embodiments, top surface 152 includes chamfered edges 159, 161 between female fittings 130. Exterior chamfered edges 159 may be angled at the same angle as interior chamfered edges 161 or may be angled at a different angle than interior chamfered edges 161.

Female fittings 130 are inserted through openings 158 (see FIG. 17) that extend through stringer 150. Female fittings 130 may be permanently attached to stringer 150, for example, by hotplate welding each of the female fittings 130 to stringer 150 after each of the female fittings 130 has been inserted through a corresponding opening 158.

Stringer 150 may be rotationally molded so that stringer 150 defines a hollow outer shell 151 and includes an internal cavity 156 (see FIG. 19). Similar to deck 40, internal cavity 156 of stringer 150 is filled with a support material that gives stringer 150 increased strength and rigidity. The support material may be a plastic material mixed with additional non-plastic materials such as crushed minerals, silica sand, fibers, and/or porous materials such as pumice and flue ash. In some embodiments, stringer 150 includes fill ports 155 that provide access to cavity 156 of stringer 150. Insertable plugs may be used to close fill ports 155 when pallet assembly 20 is in use.

Figure 17:
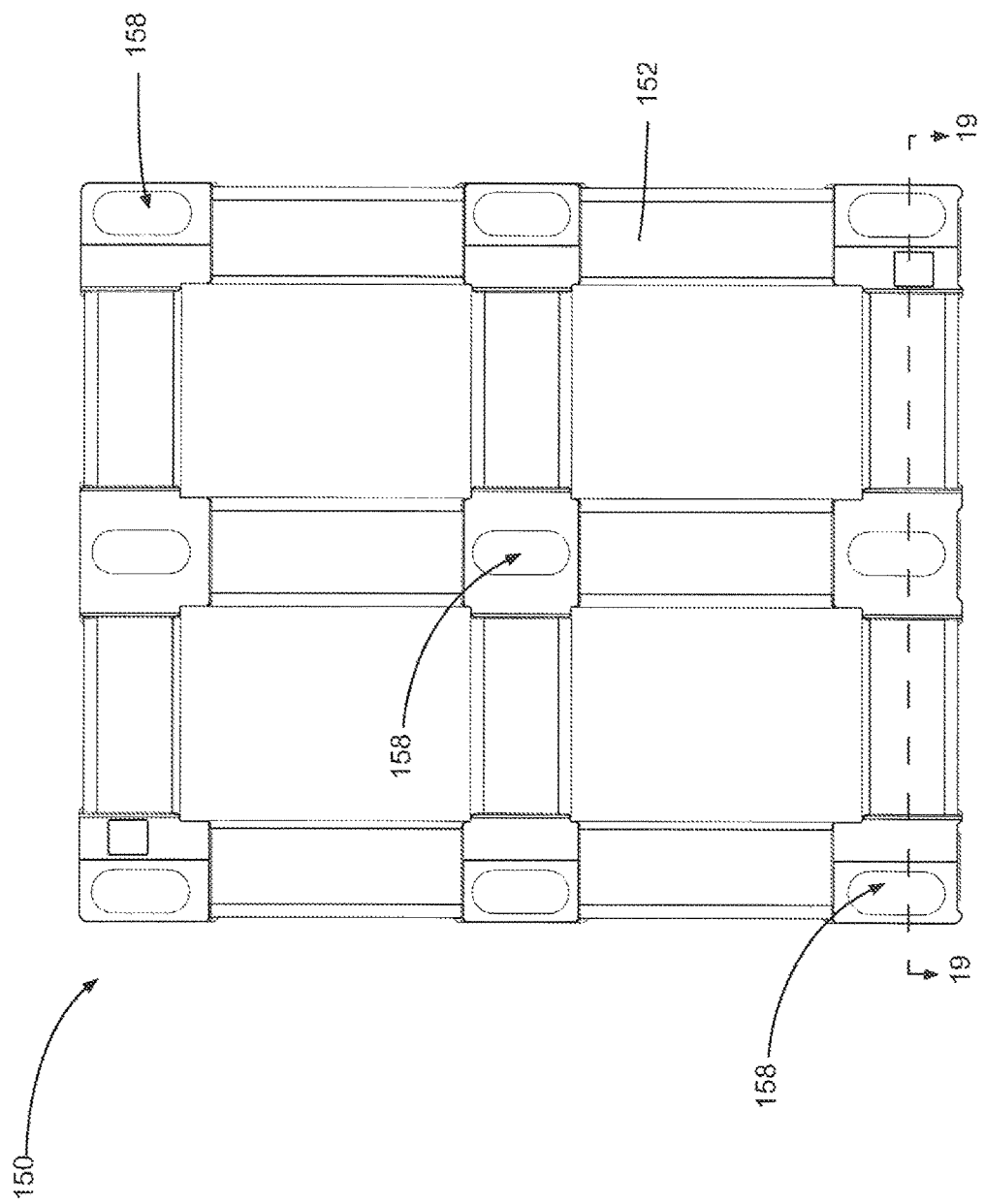
FIG. 17 is a top plan view of a stringer of the base assembly of FIG. 16.

As shown in FIGS. 17-18, openings 158 extending through stringer 150 are positioned to correspond with the position of fitting attachment sections 55 on deck 40. Therefore, when male fittings 110 are attached to fitting attachment sections 55 and female fittings 130 are attached to stringer 150, the male fittings 110 will align with female fittings 130. In the embodiments, shown, stringer 150 includes a total of nine openings 158 arranged in three rows having three openings 158. Other embodiments may include more openings 158 or fewer openings 158 as desired.

On the bottom of stringer 150, shown in FIG. 18, each of the openings 158 are surrounded by a cavity 160. Cavity 160 interacts with the base of a female fitting 130 inserted through opening 158 to secure female fitting 130 to prevent female fitting 130 from being inadvertently removed from stringer 150.

Recesses 172 are also defined in bottom surface 154. Recesses 172 are positioned on bottom surface 154 to correspond with the position of at least a portion of the insert apertures 54 in support assembly 34.

Various views of a female fitting 130 are shown in FIGS. 20-23. Female fitting 130 includes a body 131 that has an upper portion 132 and a bottom portion 133. The upper portion 132 of body 131 includes an upper lip 135 that surrounds a fitting cavity 136 that extends through body 131. Fitting cavity 136 is dimensioned to receive a male fitting 110.

Upper lip 135 is sized to fit within groove 57 of the fitting attachment section 55, so that when base assembly 75 is attached to support assembly 34, upper lip 135 of female fitting 130 can be positioned within groove 57. This arrangement allows for a more secure connection between support assembly 34 and base assembly 75 and provides greater strength to the block assembly 100 in the event block assembly 100 is contacted by a fork of a forklift or another force is applied to block assembly 100.

The bottom portion 133 of female fitting includes a fitting base 137 and a bottom surface 140. Fitting base 137 includes a lip 138 and a channel 139 surrounding lip 138. Fitting base 137 has a greater width than body 131, so that a portion of fitting base 137 extends from body 131. As shown in FIG. 22, fitting base 137 may extend across the entirety of body 131 so that fitting cavity 136 is closed. However, in other embodiments, fitting cavity 136 may be defined through fitting base 137.

A projection opening 142 is defined through each side of body 131. An upper surface 143 borders each projection opening 142. Projection openings 142 are positioned on body 131 to align with the projections 118 of male fitting 110 when male fitting 110 is positioned within fitting cavity 136 of female fitting 130. To match male fitting 110, the embodiment of female fitting 130 shown in FIGS. 20-23 has a body 131 with a race track type shape with long straight sides and circular ends. The projection openings 142 on the longer sides of body 131 have a greater width, Y, than the projection openings 142 on the shorter sides of body 112. In other embodiments, projection openings 142 may all be the same width. Additionally, in other embodiments, there may be a fewer number of projection openings 142 or a greater number of projection openings 142 as needed to correspond with the projections 118 of male fittings 110.

FIG. 24 shows a cross-sectional view of a portion of base assembly 75 to illustrate how female fitting 130 is attached to stringer 150. As shown, female fitting 130 extends completely through opening 158 in stringer 150 so that the bottom surface 140 of female fitting 130 is even with or slightly below the bottom surface 154 of stringer 150. Therefore, when pallet assembly 20 is placed on the ground or another support surface, the bottom surfaces 140 of female fittings 130 are in contact with the ground or a support surface 180. This allows the load carried by support assembly 34 to be transferred directly from deck 40 through male fittings 110 and female fittings 130 to the support surface 180 rather than through compression of stringer 150, reducing the force placed on stringer 150.

Female fitting 130 is positioned within opening 158 so that lip 138 of fitting base 137 is aligned with a lip 162 of cavity 160. Lip 138 of fitting base 137 is in contact with lip 162 and may be welded to lip 162 so that female fitting 130 is permanently attached to stringer 150. In other embodiments, other methods of attachment may be used, such as the use of an adhesive to attach female fitting 130 to stringer 150.

FIG. 25 illustrates a cross-sectional view of block assembly 100 with male fitting 110 positioned within a female fitting 130. Male fitting 110 is inserted into fitting cavity 136. As male fitting is inserted through fitting cavity 136, projections 118 are flexed inward by body 131 of female fitting 130, allowing male fitting 110 to be moved toward fitting base 137. As male fitting 110 reaches fitting base 137, projections 118 align with projection openings 142 in female fitting 130. At this point, body 131 of female fitting 130 no longer applies force on projections 118, and projections 118 are allowed to flex outward, through a respective opening 142.

Projections 118 interact with projection openings 142 to prevent male fitting 110 from being removed from female fitting 130 once male fitting has been inserted into fitting cavity 136. The top surface 120 of projection 118 contacts upper surface 143 adjacent projection opening 142, preventing male fitting 110 from being slid upward and out of female fitting 130. In order to remove male fitting 110, all of the projections 118 must be flexed inward to allow clearance between top surface 120 and upper surface 143 bordering projection opening 142.

Additionally, as shown in FIG. 25, upper lip 135 of female fitting 130 extends further than flanges 116 of male fitting 110. This feature allows upper lip 135 to be fit into groove 57 of fitting attachment section 55 on deck 40 while flanges 116 are in contact with flanges 58 from fitting attachment section 55 on deck 40. Inserting upper lip 135 into groove 57 provides additional strength to block assembly 100, increasing the effective rigidity of female fitting 130 by reducing movement of upper lip 135 relative to deck 40. Inserting upper lip 135 into groove 57 can also reduce the likelihood of block assembly 100 being unattached from deck 40.

In some embodiments, block assembly 100 may provide a surface for application of a hot stamp foil. The hot stamp foil may be used for identification or for other desired forms of decoration. As an example, the planar side portion 121 of block assembly 100 may be a suitable area for application of hot stamp foil.

In some embodiments, a tracking device 146 may be housed within a hollow interior portion of male fitting 110 of block assembly 100. Tracking device 146 may use RFID, Bluetooth, GPS or any other suitable communication method for relaying information from the pallet. As an example, the information provided by tracking device 146 may include location information such as a specified destination. Other information such as pallet identification may also be provided. Tracking device 146 can also optionally monitor and report environmental factors such as temperature and humidity. In other embodiments, tracking device 146 may be located in other portions of pallet assembly 20 rather than within male fitting 110. For example, tracking device 146 may be installed within internal cavity 45 of deck 40.

Figure 26:
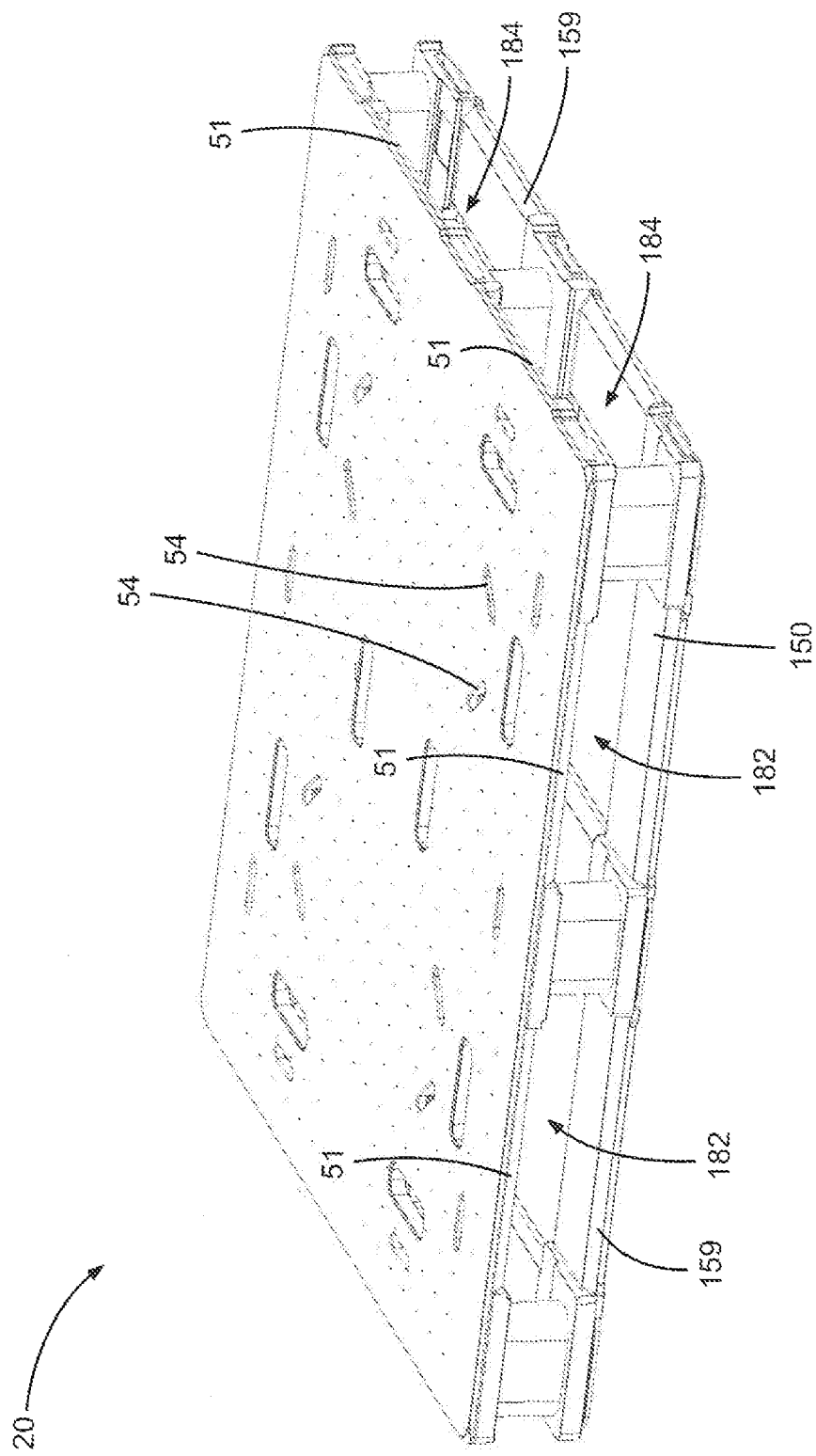
FIG. 26 is a perspective view of the pallet assembly of FIG. 1.

FIG. 26 illustrates an embodiment of support assembly 34 that includes a total of nine block assemblies 100. In the embodiment shown, the blocks are evenly distributed across the lower surface 44 of deck 40 with three rows of three blocks assemblies. Block assemblies 100 are spaced at a width from each other to create two gaps 182, 184, that extend the length of support assembly 34. The width of gaps 182 is large enough so that each gap 182 may receive a fork of a forklift or a pallet jack. In some embodiments, additional gaps 184 between blocks on an adjacent edge of support assembly 34 may also be wide enough to receive a fork of a forklift, allowing pallet assembly 20 to be picked up from any of the four sides of pallet assembly 20.

As shown in FIG. 26, insert apertures 54 may be positioned approximately midway between adjacent block assemblies 100 in gaps 182, 184 so that a fork inserted through gaps 182, 184 will contact a resilient insert 60 inserted in insert apertures 54. When a fork is raised to lift pallet assembly 20, the fork will contact and compress resilient inserts 60 rather than applying the entirety of its force on lower surface 44 of deck 40. This may increase the friction between support assembly 34 and the forks.

Deck 40 may include chamfers 51 positioned above gaps 182, 184 to guide a fork from a forklift into gap 182 or 184. Similarly, stringer 150 may also include chamfered edges 159 to further guide a fork from a forklift or a hand truck into gap 182 or 184. The wheels from a hand truck are able to roll over chamfered edges 159 so that the forks from the hand truck may be positioned beneath deck 40. In some embodiments, chamfered edges 159 on the exterior side of stringer 150 may be angled differently from chamfered edges 161 on the interior side of stringer 150. For example, the interior chamfered edges 161 may have a steeper angle than exterior chamfered edges 159, making it more difficult to remove the hand truck from beneath deck 40 in the event that pallet assembly 20 slips on the hand truck. In other embodiments, exterior chamfered edges 159 may be steeper than the interior chamfered edges 161 or exterior chamfered edges 159 may have the same angle as the interior chamfered edges.

In some embodiments, body 131 of female fittings 130 may include a series of parallel grooves that help to protect block assemblies 100 from damage or from breaking due to being contacted by the fork of a forklift or any other object used to pick up or move pallet assembly 20. These grooves can be included on the rounded corners of each of the block assemblies 100. Body 131 of female fittings 130 may be made of a resilient material that allows body 131 to deform upon impact.

As a the fork from a forklift is inserted through a gap 182 or 184, the most likely portion of the block to get struck by the fork would be one of its corners as the fork is inserted into gap 182 or 184. Therefore, it may be desirable to have grooves on corners of a block assembly to protect the block from damage. Additionally, ribs defined between the grooves create a thicker wall (for the same weight of material) which may provide a warning system to forklift drivers that they have not properly aligned the forks and will soon be piercing a block if they continue on the same entry. Since pallet assembly 20 is arranged to be lifted by a forklift from any desired edge, each of the outer blocks may be in line to be impacted by a fork being inserted through a gap 182 or 184.

This is merely one possible arrangement of the grooves on female fittings 130 of a support assembly 34. Other embodiments may include female fittings without grooves, may include grooves on every female fittings, or may include female fittings that are completely covered in grooves.

Although pallet assembly 20 is shown as having nine block assemblies 100, other embodiments may include fewer or greater block assemblies 100 and may have different arrangements or orientations of block assemblies 100. As an example, support assembly 34 may include four or five blocks, or support assembly 34 may have twelve blocks. Additionally, other embodiments may have a different arrangement of blocks 100 rather than being evenly distributed along deck 40. For example, blocks 100 may be arranged so there is a greater density of blocks one half of deck 40 and a smaller density on the other half of deck 40.

Figure 27:
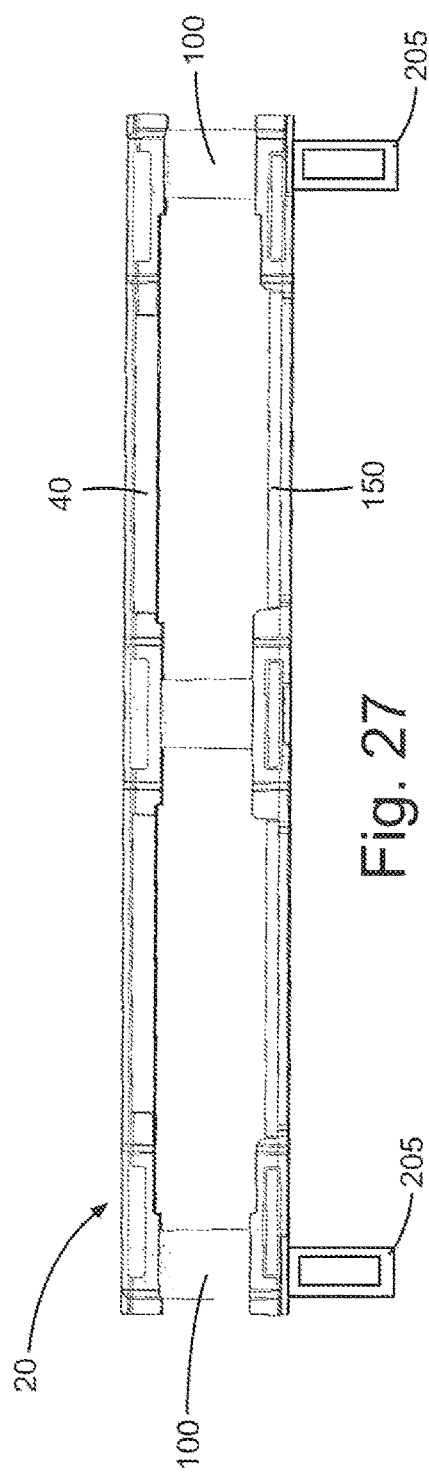
FIG. 27 is a cross-sectional side elevational view of a pallet assembly supported by a warehouse rack.

In some embodiments the dimensions of pallet assembly 20 may be determined based on a standard warehouse racking width. For example, some standard pallets may be 40 inches (1.02 m) by 48 inches (1.22 m), and standard warehouse racks are sized to accommodate this size of pallet. Block assemblies 100 may be positioned on pallet assembly 20 so that pallet assembly 20 can be aligned with a warehouse rack, so that the bottom surface of female fittings 130 rest on the frame of the warehouse rack. For example, in FIG. 27, the distance between a block assembly 100 at one end of pallet assembly 20 and a block assembly 100 at the other end of pallet assembly 20 is equal to the standard distance between the frames 205 of a rack in a warehouse so that block assemblies are positioned directly above the frames 205 of the rack.

Figure 28:
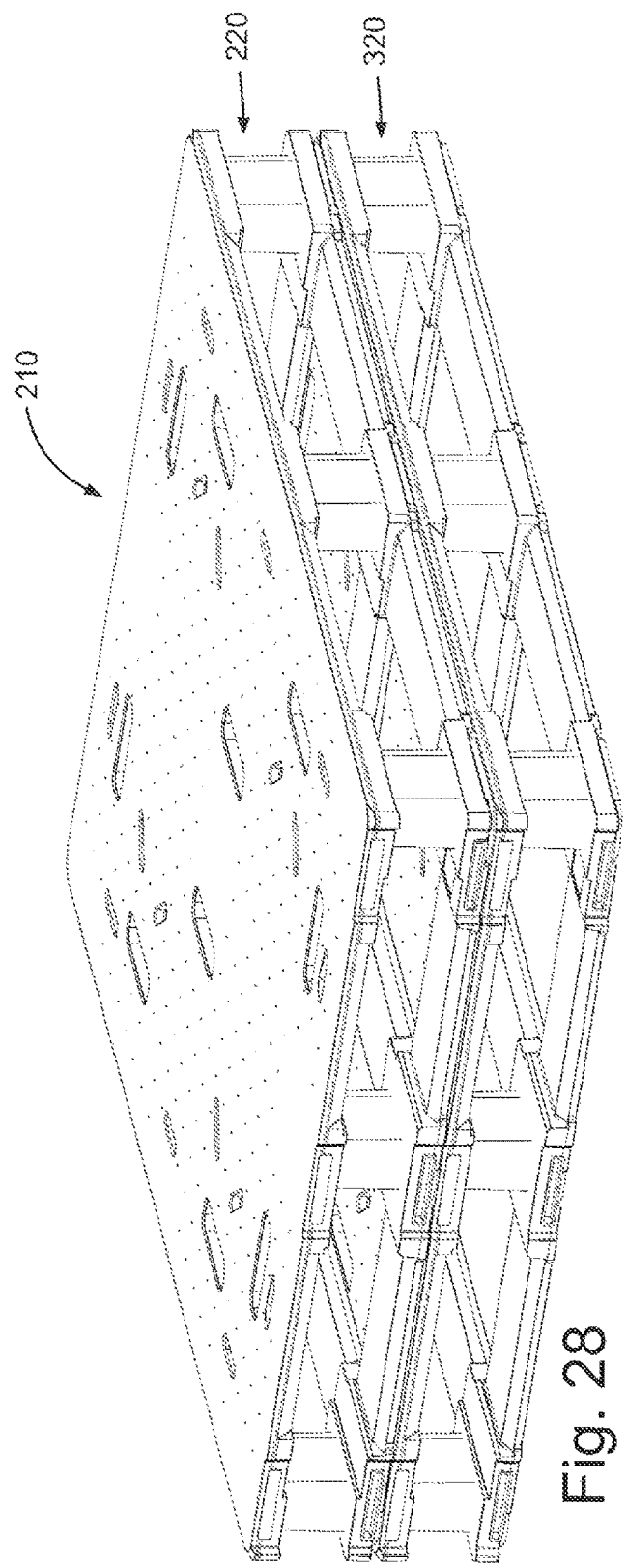
FIG. 28 is a perspective view of a first pallet assembly stacked on a second pallet assembly.
Figure 29:
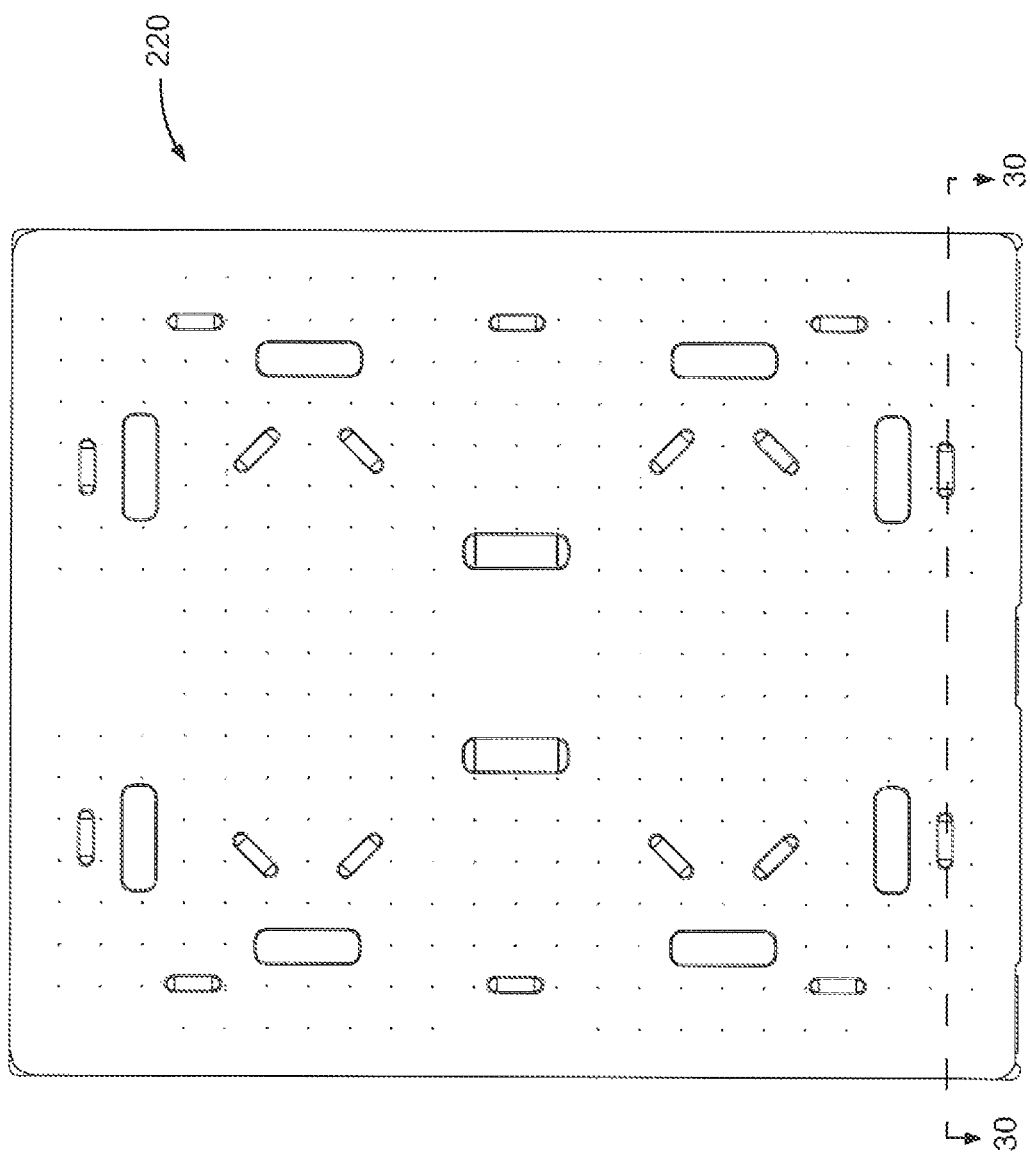
FIG. 29 is a top plan view of the stacked pallet assemblies of FIG. 28

As shown in FIGS. 28-29, pallet assemblies 20 are designed to be stackable for ease of transport and to reduce area necessary for storage. Stacked pallet assembly 210 includes a first pallet 220 is placed directly on top of a second pallet 320 so that the stringer 150 of first pallet 220 is abutting the deck 40 of second pallet 320. When first pallet 220 is atop second pallet 320, blocks 100 align so that blocks 100 of first pallet 220 are directly above block assemblies 100 of second pallet 320.

Additionally, as shown in FIGS. 30-31, the recesses 172 of first pallet 220 are aligned with resilient inserts 60 of the second pallet 320, allowing upper faces 62 of resilient inserts 60 to be received within recesses 172. This allows first pallet 220 to be stacked on second pallet 320 without a gap forming between the two pallets 220, 320 if the upper face 62 of resilient insert 60 protrudes above upper surface 12. A projection 173 or a series of projections 173 may extend from recess 172 and interact with upper face 62 of a resilient insert 60 to increase frictional engagement between stacked pallets and provide some interlock between the stacked pallets. Additionally, upper face 62 may produce friction between pallets 220, 320, for example between projection 173 and upper face 62, to help reduce movement of first pallet 220 relative to second pallet 320.

In some embodiments, upper surface 42 of deck 40 may include grip protrusions 43 that extend from upper surface 42 (see FIG. 3). Grip protrusions 43 may increase friction between deck 40 and a load placed on deck 40 and may also assist to prevent damage to the deck 40. Grip protrusions 43 may also correspond with grip indents 174 on the bottom surface 154 of stringer 150 (see FIG. 18). When a first pallet 220 is stacked on top of a second pallet 320, the grip indents 174 from first pallet 220 align with the grip protrusions 43 of second pallet 320. The grip protrusions 43 and grip indents 174 can help to align and interlock the stacked pallets 220, 320 and also help provide additional resistance to help prevent the first pallet 220 from moving relative to the second pallet 320.

In some embodiments, grip protrusions 43 may be approximately 1 mm in diameter and approximately 0.5 mm in height. The spacing of grip protrusions 43 on deck 40 may be approximately 50 mm. Likewise, the corresponding grip indents 174 must have a diameter of at least 1 mm and a depth of at least 0.5 mm, so that grip indent 174 may receive a grip protrusion 43. However, these are representative dimensions. Other embodiments may have grip protrusions 43 with different diameters and different heights. Some embodiments may include different sized grip protrusions 43 on the same deck 40, as long as grip indents 174 correspond with the different sizes of the grip protrusions 43.

Figure 32:
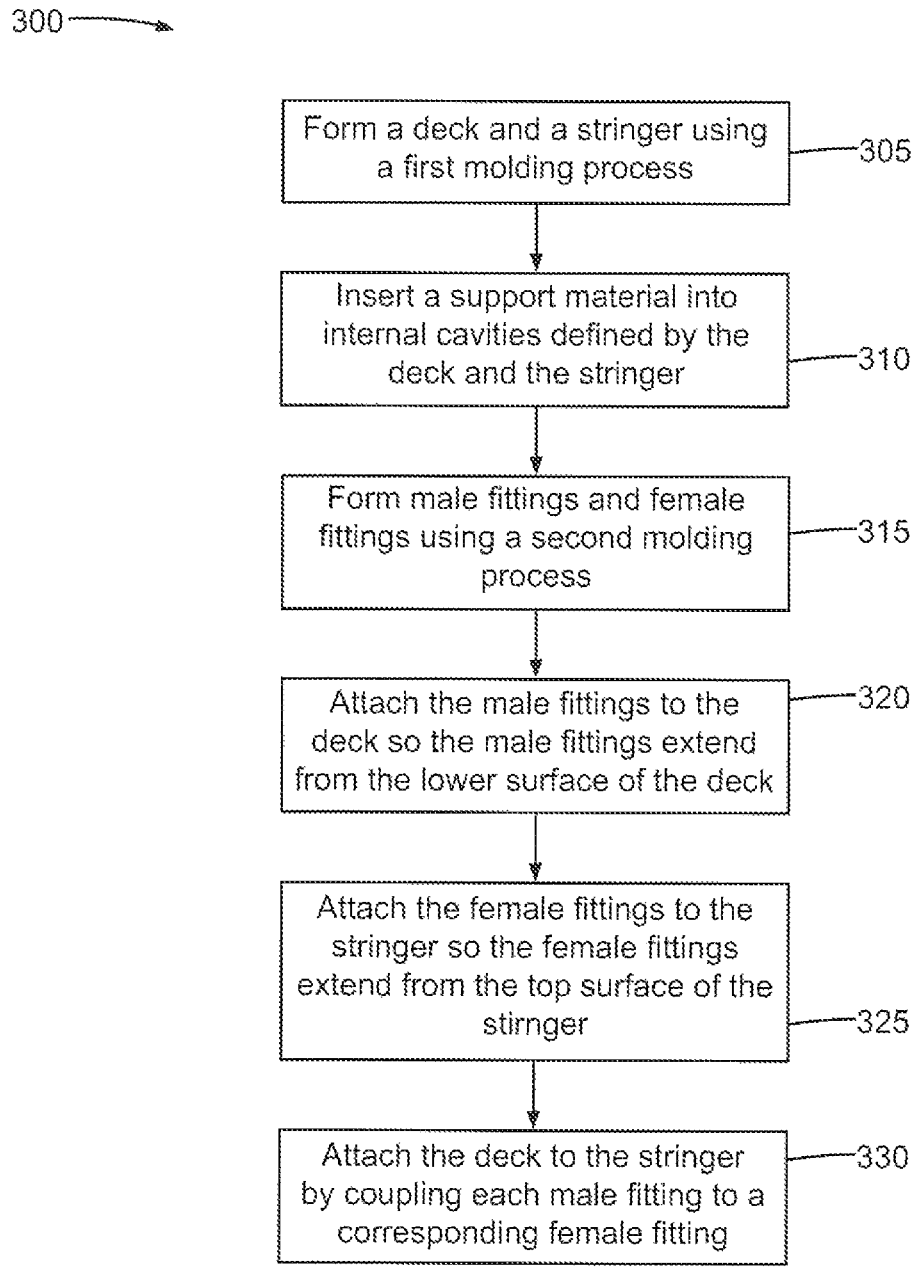
FIG. 32 is a flowchart for a process of manufacturing the pallet assembly of FIG.

FIG. 32 illustrates a flowchart 300 for manufacturing a pallet assembly 20. To manufacture pallet assembly 20, deck 40, stringer 150, male fittings 110, and female fittings 130 may be manufactured separately. This allows each of the components to be made from different materials to optimize placement of material to modify the characteristics of each component. As an example, the materials for each of the deck 40, stringer 150, male fittings 110, and female fittings 130 may be chosen to optimize weight and/or strength in desired areas. Material choice may be further used to reduce cost. In some embodiments, male fittings 110 and female fittings 130 may be made from different materials to optimize and improve impact resistance.

In a first stage 305, a deck and a stringer are formed using a first molding process. For example, one method of manufacturing deck 40 and stringer 150 is to use rotational molding; however, any other suitable method of molding or other desired method of manufacturing may be used. The relatively thin deck 40 and stringer 150 allows a quick molding and processing time and allows many decks 40 and many stringers 150 to be molded on the same machine at the same time. Male fittings 110 and female fittings 130 may be similarly constructed using rotational molding or any other suitable molding or alternative manufacturing method.

In stage 310, a support material is inserted into the internal cavity 45 of deck 40 and the internal cavity 156 of stringer 150. As already discussed above, the support material may be a mixture of a foaming agent and other plastic and non-plastic materials. The support material may be more rigid than the material that is used to form deck 40 and stringer 150. As an example, the support material may comprise a mineral fill material, for example a silicate material such as sand, or a carbonate such as calcium carbonate. However, other suitable mineral fill material may also be used. The support material is inserted into internal cavities 45, 156 through fill ports 50, 155. After the desired amount of support material has been added to internal cavities 45, 156, caps are placed over fill ports 50, 155 to prevent the support material from being removed from internal cavities 45, 156.

In a third stage 315, male fittings 110 and female fittings 130 are manufactured using a second molding process. This second molding process may be a manufacturing method that is a different from the method of manufacturing used to form deck 40 and stringer 150. For example, male fittings 110 and female fittings 130 may be manufactured using injection molding while deck 40 and stringer 150 are manufactured by rotational molding. This allows flexibility for manufacturing each component of pallet assembly 20 so as to increase ease of manufacturing, decrease cost of manufacturing, and/or adjust strength and performance characteristics of the different components.

As previously discussed, deck 40 and male fittings 110 are attached to form support assembly 34. In stage 320, male fittings 110 are attached to deck 40 so that male fittings 110 extend from lower surface 44 of deck 40. In some embodiments, male fittings 110 may be permanently attached to deck 40 by welding male fittings 110 to deck 40. In one example, male fittings 110 are hotplate welded to deck 40; however, other forms of welding or other suitable methods of attachment may be used.

In stage 325, female fittings 130 are attached to stringer 150 so that female fittings 130 extend from the top surface 152 of stringer 150 to form base assembly 75. Female fittings 130 may be permanently attached to stringer 150 by welding female fittings 130 to stringer 150. In one example, female fittings 130 are hotplate welded to stringer 150; however, other forms of welding or other suitable methods of attachment may be used.

In stage 330, to finish construction of pallet assembly 20, support assembly 34 is attached to base assembly 75 by coupling each of the male fittings 110 with a corresponding female fitting 130. In some embodiments, coupling male fitting 110 to female fitting 130 is accomplished by sliding male fitting 110 into a fitting cavity 136 in female fitting 130, as previously discussed and as shown in FIG. 25. The interaction between projections 118 on male fitting 110 and projection openings 142 in female fitting 130 provide a snap lock that holds support assembly 34 and base assembly 75 together.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

We claim:

1. A pallet assembly comprising:
   a support assembly including:
      a deck molded from a plastic shell material, wherein said deck includes an upper surface and a lower surface, and wherein said deck defines an internal cavity filled with a support material that comprises a mixture of both plastic and non-plastic materials;
      a plurality of male fittings attached to said deck, wherein said male fittings extend away from and below the lower surface of said deck;
   a base assembly including:
      a stringer having a top surface and a bottom surface, wherein said stringer defines a plurality of openings, and wherein each individual opening extends through both said top surface and said bottom surface of said stringer;
      a plurality of female fittings, wherein each of the plurality of female fittings extends completely through an individual opening in said stringer so that a base of said each of said female fittings is either flush with the bottom surface of said stringer or extends beyond and below the bottom surface of said stringer; and
   wherein each of the plurality of male fittings is coupled to a corresponding female fitting, attaching said support assembly to said base assembly.

2. The pallet assembly of claim 1 wherein a width of said bases of said female fittings is larger than a width of said openings in said stringer.

3. The pallet assembly of claim 2,
wherein a cavity surrounding each of said openings in said stringer is defined in said bottom surface of said stringer; and
wherein said base of each of said female fittings fits into said cavity when said female fitting extends through said opening in said stringer.

4. The pallet assembly of claim 1,
wherein said deck includes a fitting attachment section that includes a body portion surrounded by a groove, and wherein each of said male fittings is configured to attach to the deck at said body portion of said fitting attachment section;
wherein each of said female fittings includes an upper lip; and
wherein said upper lip is sized to fit within said groove of said fitting attachment section, so that said upper lip of each of said female fittings is positioned within said groove when said support assembly is attached to said base assembly.

5. The pallet assembly of claim 1,
wherein each of said male fittings includes at least one projection member that extends from a body of said male fitting;
wherein each of said female fittings includes at least one projection opening adapted to receive a corresponding projection member of said male fitting when said male fitting is coupled with said female fitting so that said projection member extends at least partially through said projection opening; and,
wherein when said projection member is received in said projection opening of said female fitting, said projection member and said projection opening resist detachment of said male fitting from said female fitting.

6. The pallet assembly of claim 1, further comprising:
a plurality of apertures defined in said deck, wherein said apertures extend through said upper surface;
wherein said upper surface and said apertures define a support area; and,
wherein said upper surface comprises at least 90 percent of said support area.

7. The pallet assembly of claim 6, wherein at least two of said apertures are adapted as hand holds for carrying said pallet assembly.

8. The pallet assembly of claim 6, further comprising:
at least one resilient insert including an upper face;
wherein said resilient insert is positioned within one of said apertures in said deck; and
wherein the upper face of said resilient insert protrudes from said upper surface of said deck.

9. The pallet assembly of claim 1, further comprising:
at least one reinforcement member positioned within said internal cavity, wherein said reinforcement member is more rigid than said support material.

10. The pallet assembly of claim 9, wherein said at least one reinforcement member has an I-beam shape.

11. A method of manufacturing a pallet assembly comprising:
forming a deck and a stringer using a first molding process, wherein said deck includes a deck internal cavity and said stringer includes a stringer internal cavity;
filling at least a portion of said deck internal cavity with a support material;
filling at least a portion of said stringer internal cavity with a support material;
forming a plurality of male fittings and a plurality of female fittings using a second molding process that is different from said first molding process;
attaching said male fittings to said deck so that said male fittings extend away from and below a lower surface of said deck;
attaching said female fittings to said stringer so that said female fittings extend away from and above a top surface of said stringer; and
attaching said deck to said stringer by coupling each of said male fittings to a corresponding female fitting.

12. The method of claim 11, wherein said first molding process is rotational molding.

13. The method of any one of claim 11, wherein said second molding process is injection molding.

14. The method of claim 11, wherein said male fittings are attached to said deck by welding.

15. The method of claim 11, wherein said female fittings are attached to said stringer by welding.

16. A stacked pallet assembly comprising:
a first pallet assembly stackable on a second pallet assembly, each pallet assembly comprising:
a support assembly including:
a deck including an upper surface, a lower surface, and a thickness between said upper surface and lower surface, wherein said deck defines a plurality of apertures that extend through said thickness of said deck;
at least one resilient insert including an upper face and a lower face positioned within one of said apertures in said deck, wherein the upper face of said resilient insert protrudes from said upper surface of said deck, and wherein the lower face of said resilient insert protrudes from or is flush with said lower surface of said deck;
a plurality of male fittings attached to said deck, wherein said male fittings extend away from and below a lower surface of said deck;
a base assembly including:
a stringer having a top surface and a bottom surface defining a plurality of recesses, wherein said stringer is positioned parallel to the deck of said support assembly;
a plurality of female fittings extending away from and above the top surface of said stringer, wherein each female fitting is adapted to receive a corresponding male fitting to couple said base assembly to said support assembly; and
wherein said recesses on the bottom surface of said stringer of said first pallet assembly are positioned to correspond with said apertures defined through the upper surface of said deck of said second pallet assembly so that when said stringer of said first pallet assembly is placed on top of said support assembly of said second pallet assembly, said resilient insert of said second pallet assembly fits into a respective recess in said stringer of said first pallet assembly.

17. The stacked pallet assembly of claim 16, wherein said resilient insert is made of a material that is more resilient than said deck.

18. The stacked pallet assembly of claim 16, further comprising:
a longitudinal axis along a plane of said deck;
a latitudinal axis along a plane of said deck and perpendicular to said longitudinal axis;
wherein some of said apertures are parallel to said longitudinal axis; and, wherein some of said apertures are parallel to said latitudinal axis.

19. The stacked pallet assembly of claim 18, wherein at least one of said apertures is positioned at an oblique angle with respect to said longitudinal axis.

20. The stacked pallet assembly of claim 16, wherein each of said female fittings includes a base and wherein said base of at least one of said female fittings of said first pallet assembly contacts said upper surface of said deck of said second pallet assembly when said first pallet assembly is stacked on said second pallet assembly.

21. The stacked pallet assembly of claim 16, further comprising:
- a plurality of grip protrusions positioned on said upper surface of said deck;
- a plurality of grip indents positioned on said bottom surface of said stringer; and
- wherein said grip indents in said stringer of said first pallet assembly are positioned to correspond with said grip protrusions on the deck of said second pallet assembly so that when the stringer from said first pallet assembly is stacked on top of the support assembly of said second pallet assembly, said grip protrusions fit into said grip indents and resist said first pallet assembly and said second pallet assembly from moving relative to each other.

\* \* \* \* \*